United States Patent
Mistry

(10) Patent No.: US 11,438,357 B2
(45) Date of Patent: Sep. 6, 2022

(54) ENDPOINT NETWORK SENSOR AND RELATED CYBERSECURITY INFRASTRUCTURE

(71) Applicant: Senseon Tech Ltd, London (GB)

(72) Inventor: James Mistry, London (GB)

(73) Assignee: Senseon Tech Ltd, London (GB)

( * ) Notice: Subject to any disclaimer, the term of this patent is extended or adjusted under 35 U.S.C. 154(b) by 0 days.

(21) Appl. No.: 17/551,068

(22) Filed: Dec. 14, 2021

(65) Prior Publication Data

US 2022/0182403 A1 Jun. 9, 2022

Related U.S. Application Data

(63) Continuation-in-part of application No. 17/133,839, filed on Dec. 24, 2020, now Pat. No. 11,265,339, and (Continued)

(30) Foreign Application Priority Data

Jun. 22, 2018 (GB) .................................... 1810294
Dec. 15, 2020 (GB) .................................... 2019785

(51) Int. Cl.
H04L 29/06 (2006.01)
H04L 9/40 (2022.01)

(52) U.S. Cl.
CPC ...... *H04L 63/1425* (2013.01); *H04L 63/1416* (2013.01); *H04L 63/1466* (2013.01); *H04L 63/166* (2013.01); *H04L 63/20* (2013.01)

(58) Field of Classification Search
CPC .... H04L 63/1425; H04L 43/028; H04L 43/08
See application file for complete search history.

(56) References Cited

U.S. PATENT DOCUMENTS 8,131,846 B1 3/2012 Hernacki et al.
8,239,668 B1 8/2012 Chen et al.
(Continued)

FOREIGN PATENT DOCUMENTS

EP 3772209 A1 2/2021
EP 3800863 A1 4/2021
(Continued)

OTHER PUBLICATIONS

Balasubramaniyan et al., "An architecture for intrusion detection using autonomous agents." Proceedings 14th annual computer security applications conference (Cat. No. 98EX217). IEEE, 1998. 19 pages.
(Continued)

*Primary Examiner* — Arvin Eskandarnia
(74) *Attorney, Agent, or Firm* — Smith Baluch LLP

(57) ABSTRACT

In one or more examples, an advanced form of network endpoint sensor is deployed to an endpoint device to provide local monitoring and reporting of network traffic flowing to and/or from the endpoint device. For example, such network endpoint sensors may reduce reliance on other types of monitoring component (such as mirrors/TAPs) and/or complement functionality of other type(s) of monitoring component (e.g. in a deployment with "roaming" endpoints). In one or more examples, network data may be linked or otherwise associated with endpoint data locally at an endpoint device. In one or more examples, such linking may be performed locally prior to reporting, response and/or remediation.

22 Claims, 26 Drawing Sheets

Related U.S. Application Data a continuation-in-part of application No. 17/130,334, filed on Dec. 22, 2020, which is a continuation of application No. PCT/EP2019/066479, filed on Jun. 21, 2019.

(56) References Cited

U.S. PATENT DOCUMENTS

| | | |
|---|---|---|
| 9,069,954 B2 | 6/2015 | Anurag |
| 9,571,524 B2 | 2/2017 | Dotan et al. |
| 9,749,342 B1 | 8/2017 | Krage et al. |
| 9,767,663 B2 | 9/2017 | Reske |
| 9,773,112 B1 | 9/2017 | Rathor et al. |
| 9,800,605 B2 | 10/2017 | Baikalov et al. |
| 9,998,425 B2 | 6/2018 | Raman et al. |
| 10,091,235 B1 | 10/2018 | Kushwaha et al. |
| 10,104,118 B2 | 10/2018 | Wang et al. |
| 10,109,166 B1 | 10/2018 | Selinger et al. |
| 11,228,604 B2 | 1/2022 | Mistry et al. |
| 11,265,339 B1 | 3/2022 | Mistry |
| 2003/0070003 A1 | 4/2003 | Chong et al. |
| 2005/0050336 A1 | 3/2005 | Liang et al. |
| 2008/0155517 A1 | 6/2008 | Yan et al. |
| 2011/0173699 A1 | 7/2011 | Figlin et al. |
| 2012/0151588 A1 | 6/2012 | Wang et al. |
| 2012/0174228 A1 | 7/2012 | Giakouminakis et al. |
| 2012/0192003 A1 | 7/2012 | Akiyama et al. |
| 2013/0097660 A1 | 4/2013 | Das et al. |
| 2013/0298192 A1 | 11/2013 | Kumar et al. |
| 2014/0165200 A1 | 6/2014 | Singla |
| 2015/0135262 A1 | 5/2015 | Porat et al. |
| 2015/0281287 A1 | 10/2015 | Gill et al. |
| 2015/0341376 A1 | 11/2015 | Nandy et al. |
| 2016/0006753 A1 | 1/2016 | McDaid et al. |
| 2016/0021056 A1 | 1/2016 | Chesla |
| 2016/0149887 A1 | 5/2016 | Katmor et al. |
| 2016/0232353 A1 | 8/2016 | Gupta et al. |
| 2016/0234241 A1 | 8/2016 | Talamanchi et al. |
| 2016/0285858 A1 | 9/2016 | Li et al. |
| 2016/0308898 A1 | 10/2016 | Teeple et al. |
| 2016/0344762 A1 | 11/2016 | Jou et al. |
| 2016/0373477 A1 | 12/2016 | Moyle et al. |
| 2016/0381049 A1 | 12/2016 | Lakhani et al. |
| 2017/0063907 A1 | 3/2017 | Muddu et al. |
| 2017/0063917 A1 | 3/2017 | Chesla |
| 2017/0093902 A1 | 3/2017 | Roundy et al. |
| 2017/0214702 A1 | 7/2017 | Moscovici et al. |
| 2017/0220801 A1 | 8/2017 | Stockdale et al. |
| 2017/0251012 A1 | 8/2017 | Stockdale et al. |
| 2017/0359376 A1 | 12/2017 | Evron et al. |
| 2018/0027006 A1 | 1/2018 | Zimmermann et al. |
| 2018/0041537 A1 | 2/2018 | Bloxham et al. |
| 2018/0046928 A1 | 2/2018 | Jang et al. |
| 2018/0123864 A1 | 5/2018 | Tucker et al. |
| 2018/0183680 A1 | 6/2018 | Chen et al. |
| 2018/0183940 A1* | 6/2018 | Kosseifi .............. H04L 12/1403 |
| 2018/0212879 A1 | 7/2018 | Toit et al. |
| 2018/0255076 A1 | 9/2018 | Paine |
| 2018/0316705 A1 | 11/2018 | Tsironis |
| 2018/0316713 A1 | 11/2018 | Tsironis |
| 2018/0316727 A1 | 11/2018 | Tsironis |
| 2018/0332062 A1 | 11/2018 | Ford |
| 2018/0375886 A1 | 12/2018 | Kirti et al. |
| 2019/0052659 A1 | 2/2019 | Weingarten et al. |
| 2019/0089678 A1 | 3/2019 | Lam et al. |
| 2019/0173917 A1 | 6/2019 | Sites |
| 2019/0220626 A1 | 7/2019 | LeMasters et al. |
| 2019/0258800 A1 | 8/2019 | Ladnai et al. |
| 2019/0260764 A1 | 8/2019 | Humphrey et al. |
| 2019/0260785 A1 | 8/2019 | Jenkinson et al. |
| 2019/0266324 A1 | 8/2019 | Edwards et al. |
| 2019/0332690 A1 | 10/2019 | Gutman et al. |
| 2019/0372934 A1 | 12/2019 | Yehudai et al. |
| 2020/0143041 A1 | 5/2020 | Jung et al. |
| 2020/0186465 A1* | 6/2020 | Dontula Venkata ............ H04L 41/0896 |
| 2020/0236120 A1 | 7/2020 | Monteil et al. |
| 2020/0244673 A1 | 7/2020 | Stockdale et al. |
| 2020/0274870 A1 | 8/2020 | Zinar et al. |
| 2020/0285737 A1 | 9/2020 | Kraus et al. |
| 2020/0372150 A1 | 11/2020 | Salem et al. |
| 2020/0396190 A1 | 12/2020 | Pickman et al. |
| 2021/0036002 A1 | 2/2021 | Lee |
| 2021/0064762 A1 | 3/2021 | Salji |
| 2021/0120027 A1 | 4/2021 | Dean et al. |
| 2021/0250365 A1 | 8/2021 | Atkinson et al. |
| 2021/0273691 A1 | 9/2021 | Huang et al. |
| 2021/0273949 A1 | 9/2021 | Howlett et al. |
| 2021/0273950 A1 | 9/2021 | Lawson |
| 2021/0273953 A1 | 9/2021 | Fellows et al. |
| 2021/0273957 A1 | 9/2021 | Boyer et al. |
| 2021/0273958 A1 | 9/2021 | McLean |
| 2021/0273959 A1 | 9/2021 | Salji |
| 2021/0273960 A1 | 9/2021 | Humphrey et al. |
| 2021/0273961 A1 | 9/2021 | Humphrey et al. |
| 2021/0273973 A1 | 9/2021 | Boyer et al. |
| 2021/0329016 A1 | 10/2021 | Atkinson et al. |
| 2021/0360027 A1 | 11/2021 | Boyer et al. |
| 2021/0397710 A1 | 12/2021 | Cohen et al. |
| 2022/0019659 A1 | 1/2022 | Salem et al. |

FOREIGN PATENT DOCUMENTS

| | | |
|---|---|---|
| KR | 20160011261 A | 2/2016 |
| WO | 2015191052 A1 | 12/2015 |
| WO | 2017160760 A1 | 9/2017 |
| WO | 2017160770 A1 | 9/2017 |
| WO | 2019038527 A1 | 2/2019 |
| WO | 2019243579 A1 | 12/2019 |
| WO | 2020021100 A1 | 1/2020 |
| WO | 2021171090 A1 | 9/2021 |
| WO | 2021171092 A2 | 9/2021 |
| WO | 2021171093 A1 | 9/2021 |
| WO | 2021171092 A3 | 10/2021 |
| WO | 2021236661 A1 | 11/2021 |
| WO | 2021236663 A1 | 11/2021 |

OTHER PUBLICATIONS

Caithness et al. "Anomaly detection for industrial big data." arXiv preprint arXiv: 1804.02998 (2018) 9 pages.
Combined Search and Examination Report in GB Patent Application No. 2109995.7 dated Aug. 9, 2021, 3 pages.
Combined Search and Examination Report in United Kingdom Patent Application No. GB2019785.1 dated Mar. 12, 2021, 8 pages.
Extended European Search Report in European Patent Application No. 20217813.3 dated Jun. 28, 2021. 11 pages.
Hindy et al., "A taxonomy of malicious traffic for intrusion detection systems." 2018 International Conference on Cyber Situational Awareness, Data Analytics and Assessment (Cyber SA) IEEE, 2018. 4 pages.
International Search Report and Written Opinion in International Application No. PCT/EP2020/078643, dated Feb. 1, 2021, 21 pages.
International Search Report and Written Opinion in International Patent Application No. PCT/EP2019/066479 dated Oct. 9, 2019. 14 pages.
International Search Report and Written Opinion in International Patent Application No. PCT/EP2019/070256 dated Oct. 24, 2019. 17 pages.
Ranshous et al. "Anomaly detection in dynamic networks: a survey." Wiley Interdisciplinary Reviews: Computational Statistics 7.3 (2015): 223-247 26 pages.
Search Report under Section 17 in United Kingdom Patent Application No. GB2200435.2 dated Feb. 18, 2022, 4 pages.
Snapp et al., "The {DID}(Distributed Intrusion Detection System) Prototype." {USENIX} Summer 1992 Technical Conference ({USENIX} Summer 1992 Technical Conference). 1992. 7 pages.
Xie et al. "Fast low-rank matrix approximation with locality sensitive hashing for quick anomaly detection." IEEE Infocom 2017—

(56) References Cited

OTHER PUBLICATIONS

IEEE Conference on Computer Communications. IEEE, 2017 10 pages.

* cited by examiner

ENDPOINT NETWORK SENSOR AND RELATED CYBERSECURITY INFRASTRUCTURE

CROSS-REFERENCE TO RELATED APPLICATIONS

The present application is a continuation-in-part of U.S. application Ser. No. 17/130,334, filed Dec. 22, 2020, which is a continuation of International Application No. PCT/EP2019/066479, filed Jun. 21, 2019, which in turn claims priority to United Kingdom Application No. 1810294.7, filed Jun. 22, 2018. The present application is also a continuation-in-part of U.S. application Ser. No. 17/133,839, filed Dec. 24, 2020, which claims priority to United Kingdom Application No. 2019785.1 filed on Dec. 15, 2020, each of which is hereby incorporated by reference in its entirety.

TECHNICAL FIELD

The present disclosure pertains generally to cybersecurity and to threat detection, threat response and/or threat remediation mechanisms. Example embodiments provide an endpoint network sensor (EPNS) and related cybersecurity infrastructure operable to provide rich monitoring, detection, response and/or remediation functions within a variety of deployments, where such functions may include network traffic monitoring, endpoint data collection and monitoring, manual or automated threat remediation or any combination thereof.

BACKGROUND

Cyber defence refers to technologies that are designed to protect computer systems from the threat of cyberattacks. In an active attack, an attacker attempts to alter or gain control of system resources. In a passive attack, an attacker only attempts to extract information from a system (generally whilst trying to evade detection). Private computer networks, such as those used for communication within businesses, are a common target for cyberattacks. An attacker who is able to breach (i.e. gain illegitimate access to) a private network may for example be able to gain access to sensitive data secured within it, and cause significant disruption if they are able to take control of resources as a consequence of the breach. A cyberattack can take various forms. A "syntactic" attack makes use of malicious software, such as viruses, worms and Trojan horses. A piece of malicious software, when executed by a device within the network, may be able to spread throughout the network, resulting in a potentially severe security breach. Other forms of "semantic" attack include, for example, denial-of-service (DOS) attacks which attempt to disrupt network services by targeting large volumes of data at a network; attacks via the unauthorized use of credentials (e.g. brute force or dictionary attacks); or backdoor attacks in which an attacker attempts to bypass network security systems altogether. With increasing emphasis on "remote" access, though remote desktop or virtual private network (VPN) connections and the like, further vulnerabilities and attack opportunities are created. Increasingly distributed and varied deployments create further challenges for cybersecurity monitoring and remediation systems.

SUMMARY

In example embodiments, an advanced form of network endpoint sensor is deployed to an endpoint device to provide local monitoring and reporting of network traffic flowing to and/or from the endpoint device. For example, such network endpoint sensors may reduce reliance on other types of monitoring component (such as mirrors/TAPs) and/or complement functionality of other type(s) of monitoring component (e.g. in a deployment with "roaming" endpoints). In example embodiments, network data may be linked or otherwise associated with endpoint data locally at an endpoint device. In example embodiments, such linking may be performed locally prior to reporting, response and/or remediation.

BRIEF DESCRIPTION OF FIGURES

For a better understanding of the present subject matter, and to show how embodiments of the same may be carried into effect, reference is made by way of example only to the following figures in which.

DETAILED DESCRIPTION

Example embodiments herein provide advanced network and/or endpoint monitoring functions within a network deployment through use of sensors, monitoring components (such as TAPs) and the like.

Example embodiments provide an endpoint agent or endpoint network sensor (EPNS) that reduces reliance on dedicated monitoring components, such as network TAPs, that are more typically used for monitoring of network traffic.

Such sensors may, for example, be deployed in combination with centralized cybersecurity infrastructure to provide sophisticated threat detection, analytics, response and/or remediation functions. In one or more examples, network data obtained though monitoring may be linked or otherwise associated with endpoint data, such as: one or more process identifiers of one or more processes running on an endpoint device and receiving and/or instigating network traffic; files (e.g. downloaded, uploaded or otherwise transferred to an endpoint device); users; other endpoint-type entities; or any combination thereof. Such association may be performed, for example, via linking, enrichment, augmentation, merging and/or association of events, telemetry records etc.

Association of network and endpoint data may, for example, be performed locally at an endpoint. When network traffic monitoring and summarization is performed at the endpoint device itself, it may, in some cases, be more straightforward and reliable to perform this matching locally at the device.

Association of network and endpoint data may be performed based on a combination of local processing and remote or server-side/backend processing.

In some cases, process details and/or other endpoint data may be linked or otherwise associated with an entire "flow", such as a TCP connection or UDP session, where some or all packets within the flow may be linked to one or more processes, files and/or users etc. In some cases, two or more processes, users, files etc associated with two or more endpoint devices may be linked to a common flow between those endpoint devices.

In some examples, the endpoint agent does not send full "raw" payload data, but rather provides a summary of network traffic to and from the endpoint.

Figure 1:
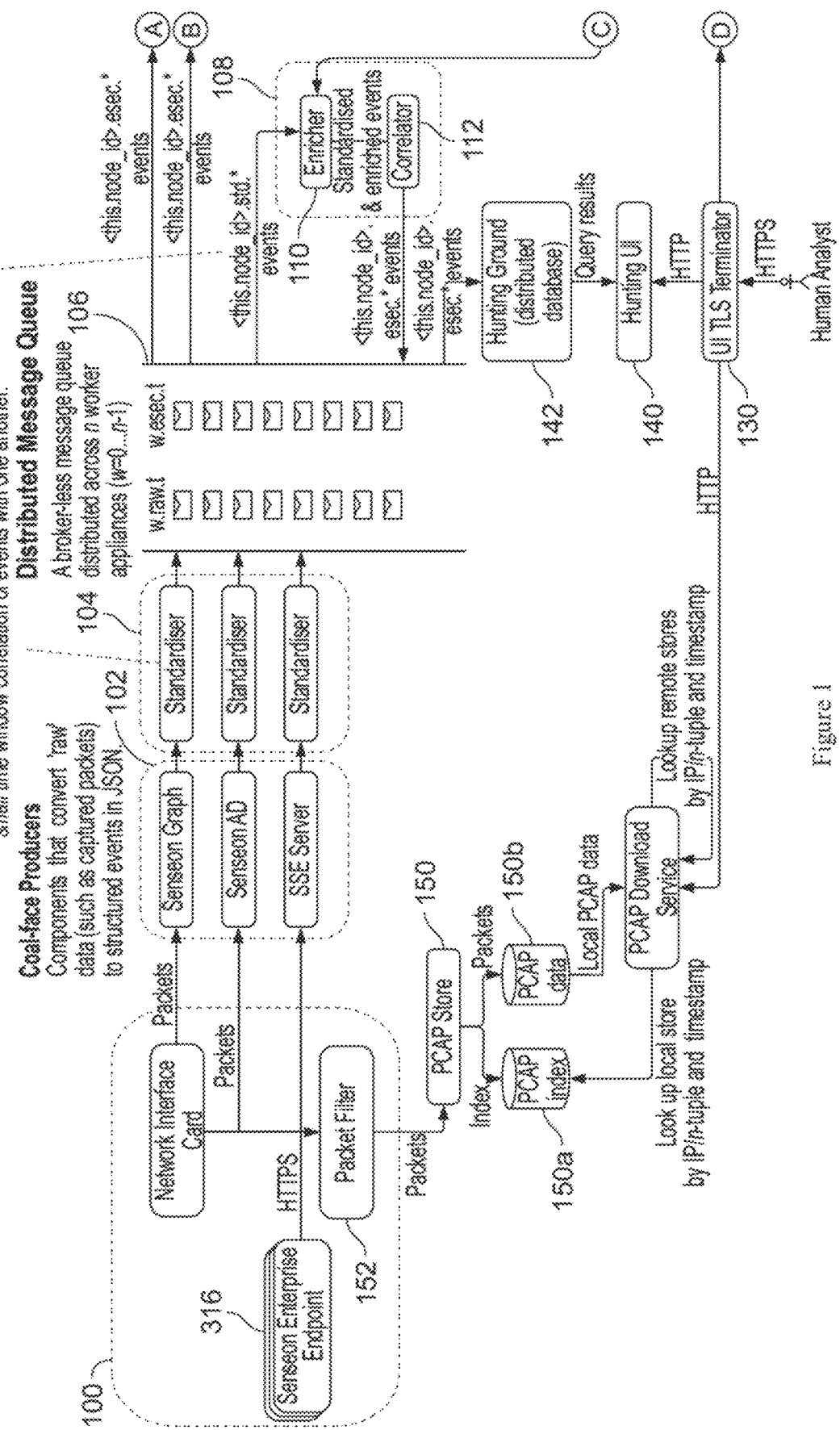
FIG. 1 shows, by way of context, a schematic function block diagram of a cyber defence platform.
Figure 1:
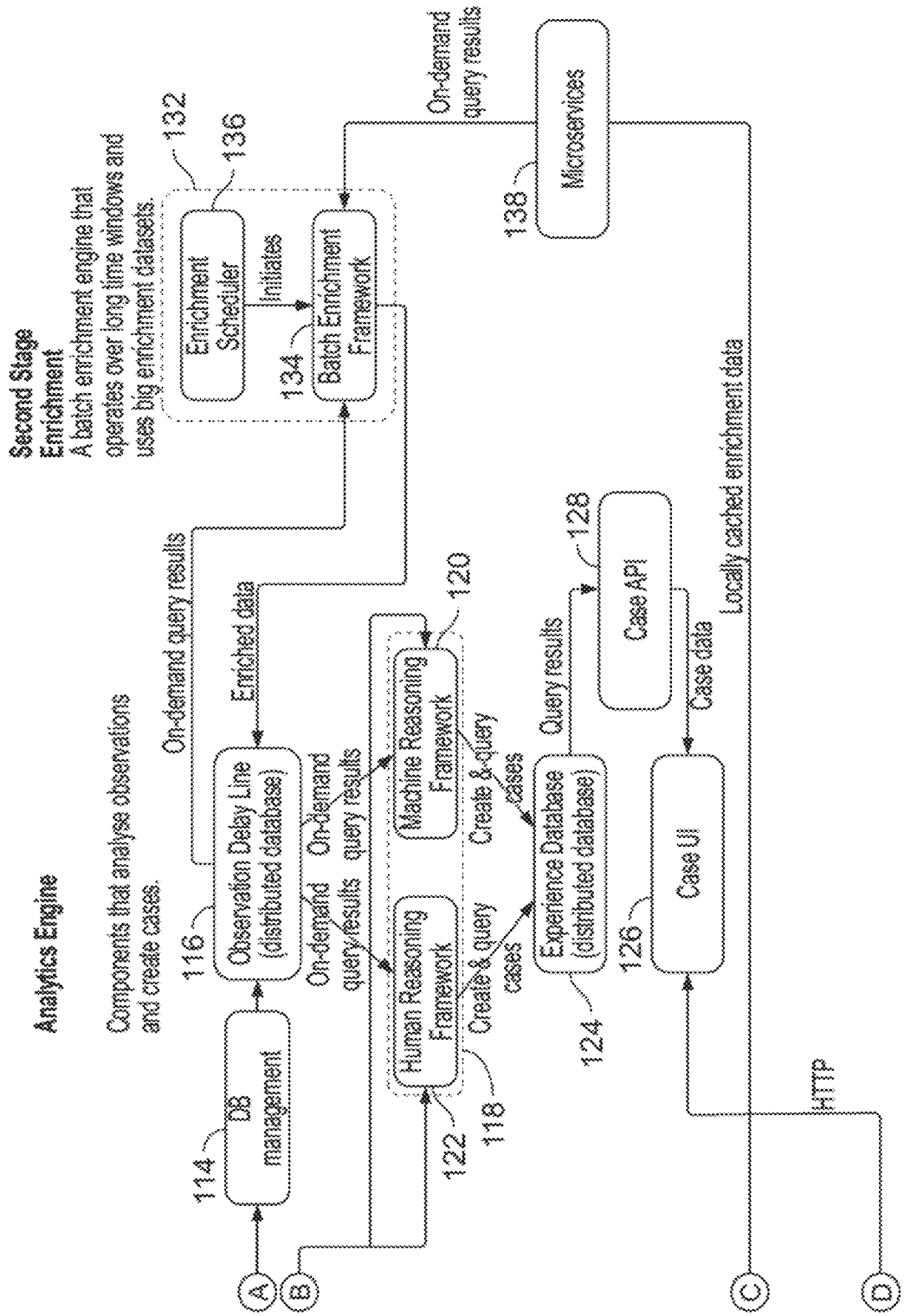

FIG. 1 shows an example of an integrated cybersecurity platform. The integrated cyber defence platform provides overarching protection for a network against cyberattacks, through a combination of comprehensive network and endpoint data collection and organization, and advanced analytics applied to the resulting output within a machine-reasoning framework.

Example embodiments compile seemingly-disparate events, records etc. into cases based on recognized tactics, techniques and/or other threat/attack patterns. Cases may, for example, be populated with network data, endpoint data or a combination of endpoint and network data obtained via one or more monitoring techniques, methods, systems taught herein etc. Example embodiments provide targeted alerts and/or reporting, reducing false positives, overreporting etc.

The platform described with reference to FIG. 1 has the ability to receive network and endpoint information from different sources and link that information together server-side.

However, by deploying "enhanced" endpoint agents within this system, the reliance on such server-side linking is reduced (or potentially eliminated). This is because the endpoint agent has the ability to link network and endpoint information locally, before it is reported to the platform. The enhanced form of endpoint agent is described below, with reference to FIG. 6.

Example System Overview

One form of analysis considers longer-term temporal correlations between events, and in particular different types of event such as network and endpoint events. Events that appear to be related are grouped into "cases" over time, as they arrive at an analysis engine. Each case has at least one assigned threat score, denoting the threat level indicated by its constituent events. For example, the threat score may denote one or both of confidence and severity (e.g. a high score may indicate a high confidence that an attack of material severity is occurring or has occurred). A threat score may, in that case, increase if the confidence increases, or the severity increases or both. In other implementations, separate confidence and severity scores may be computed and used within the system.

The described platform operates according to a "triangulation" model in which multiple forms of analysis may be used as a basis for threat detection. To provide effective triangulation, techniques such as anomaly detection, such as rules-based analytics and/or analytics based on supervised machine learning or other statistical methods more generally may be applied in any combination. By way of example, a particular form of threat detection analytics formulated around the "Mitre ATT&CK framework" (or any other structured source of attack knowledge) is described below. Whilst Mitre is considered, the description applies more generally to other forms of tactics/techniques, including tactic/techniques defined in alternative (e.g. bespoke) threat models, or learned though statistical analysis (such as supervised or unsupervised machine learning).

A feature of the platform is its ability to collect and link together different types of event, and in particular (i) network events and (ii) endpoint events. This occurs at various places within the system (e.g. at endpoints themselves and/or centrally), as described below.

The following description refers to network and endpoint events, but applies more generally to other event types received and processed within the system. Other types of event include "third party" events related to suspicious activity in third-party applications and/or services with which the platform is integrated, and/or events generated in an "Internet-of-things" (IoT) context (IoT events).

Network events are generated by collecting raw network data from components (sub-systems, devices, software components etc.) across a monitored network, and re-structuring the raw network data into network events. The raw network data can for example be obtained through appropriate network tapping, to provide a comprehensive overview of activity across the network.

Endpoint events are generated using dedicated endpoint monitoring software in the form of endpoint agents that are installed on endpoints of the network being monitored. Each endpoint agent monitors local activity at the endpoint on which it is installed, and feeds the resulting data (endpoint data) into the platform for analysis.

This combination of endpoint data with network data is an extremely powerful basis for cyber defence.

In a data optimization stage, observations are captured in the form of structured, timestamped events. Both network events and endpoint events are collected at this stage and enhanced for subsequent analysis. Events generated across different data collectors are standardized, as needed, according to a predefined data model. As part of the data optimization, first stage enrichment and joining is performed. This can, to some extent at least, be performed in real-time or near-real time (processing time of around 1 second or less). That is, network and endpoint events are also enriched with additional relevant data where appropriate (enrichment data) and selectively joined (or otherwise linked together) based on short-term temporal correlations. Augmentation and joining are examples of what is referred to herein as event enhancement.

In an analytics stage, these enhanced network events are subject to sophisticated real-time analytics, by an analysis engine. This includes the use of statistical analysis techniques commonly known as "machine learning" (ML). The analysis is hypothesis-based, wherein the likelihood of different threat hypotheses being true is assessed given a set of current or historic observations.

The creation and subsequent population of cases is driven by the results of analysing incoming events. A case is created for at least one defined threat hypothesis in response to an event that is classed as potentially malicious, and populated with data of that event. That is, each case is created in response to a single event received at the analysis engine. It is noted however that the event that causes a case to be created can be a joined event, which was itself created by joining two or more separate events together, an enriched event, or both.

Once a case has been created, it may be populated with data of subsequently received events that are identified as related to the case in question (which again may be joined and/or augmented events) in order to provide a timeline of events that underpin the case.

A case may alternatively or additionally be populated with data of one or more earlier events (i.e. earlier than the event or events that triggered its creation). This is appropriate, for example, where the earlier event(s) is not significant enough in itself to warrant opening a case (e.g. because it is too common), but whose potential significance becomes apparent in the context of the event(s) that triggered the creation of the case.

An event itself does not automatically create a case. An event may be subject to analysis (which may take into account other data—such as other events and/or external datasets) and it is the result of this analysis which will dictate if it will culminate in the creation of a new case or update of an existing case. A case can be created in response to one event which meets a case creation condition, or multiple events which collectively meet a case creation condition.

Generally, the threat score for a newly-created case will be low, and it is expected that a large number of cases will be created whose threat scores never become significant (because the events driving those cases turn out to be innocuous). However, in response to a threat occurring within the network being monitored, the threat score for at least one of the cases is expected to increase as the threat develops.

Another key feature of the system is the fact that cases are only rendered available via a case user interface (UI) when their threat scores reach a significance threshold, or meet some other significance condition. In other words, although a large number of cases may be created in the background, cases are only selectively escalated to an analyst, via the case UI, when they become significant according to defined significance criteria.

Case escalation is the primary driver for actions taken in response to threats or potential threats.

FIG. 1 shows a schematic block diagram of the cyber defence platform, which is a system that operates to monitor traffic flowing through a network as well as the activity at and the state of endpoints of that network in order to detect and report security threats. The cyber defence platform is implemented as a set of computer programs that perform the data processing stages disclosed herein. The computer programs are executed on one or more processors of a data processing system, such as CPUs, GPUs etc. The system is shown to comprise a plurality of data collectors 102 which are also referred to herein as "coal-face producers". The role of these components 102 is to collect network and endpoint data and, where necessary, process that data into a form suitable for cyber security analysis. One aspect of this is the collection of raw network data from components of the network being monitored and conversion of that raw data into structured events (network events), as described above. The raw network data is collected based on network tapping, for example.

Event standardisation components 104 are also shown, each of which receives the events outputted from a respective one of the coal-face producers 102. The standardisation components 104 standardise these structured events according to a predefined data model, to create standardized network and endpoint events.

The raw network data that is collected by the coal-face producers 102 is collected from a variety of different network components 100. The raw network data can for example include captured data packets as transmitted and received between components of the network, as well as externally incoming and outgoing packets arriving at and leaving the network respectively.

Additionally, structured endpoint events are collected using endpoint agents 316 executed on endpoints throughout the network. The endpoint agents provide structured endpoint events to the coal-face producers 102 and those events are subject to standardization, enrichment and correlation as above.

This is described in further detail below, with reference to FIG. 3.

Once standardised, the network events are stored in a message queue 106 (event queue), along with the endpoint events. For a large-scale system, the message queue can for example be a distributed message queue. That is, a message queue 106 embodied as a distributed data storage system comprising a cluster of data storage nodes (not shown in FIG. 1).

An event optimisation system 108 is shown having an input for receiving events from the message queue 106, which it processes in real-time or near real-time to provide enhanced events in the manner described below. In FIG. 1, enhanced events are denoted w.esec.t, as distinct from the "raw" events (pre-enhancement) which are denoted w.raw.t. Raw events that are stored in the message queue 106 are shown down the left hand side of the message queue (these are the standardised, structured events provided by the standardisation components 104) whereas enhanced events are shown on the right hand side. However, it will be appreciated that this is purely schematic and that the events can be stored and managed within the message queue 106 in any suitable manner.

The event enhancement system 108 is shown to comprise an enrichment component 110 and a joining component 112. The enrichment component 106 operates to augment events from the message queue 106 with enrichment data, in a first stage enrichment. The enrichment data is data that is relevant to the event and has potential significance in a cyber-security context. It could for example flag a file name or IP address contained in the event that is known to be malicious from a security dataset. The enrichment data can be obtained from a variety of enrichment data sources including earlier events and external information. The enrichment data used to enrich an event is stored within the event, which in turn is subsequently returned to the message queue 106 as described below. In this first stage enrichment, the enrichment data that is obtained is limited to data that it is practical to obtain in (near) real-time. Additional batch enrichment is performed later, without this limitation, as described below.

The joining component 112 operates to identify short-term, i.e. small time window, correlations between events. This makes use of the timestamps in the events and also other data such as information about entities (devices, processes, users etc.) to which the events relate. The joining component 112 joins together events that it identifies as correlated with each other (i.e. interrelated) on the timescale considered and the resulting joined user events are returned to the message queue 106. This can include joining together one or more network events with one or more endpoint events where appropriate.

In FIG. 1, the joining component 112 is shown having an output to receive enriched events from the enrichment component 110 such that it operates to join events, as appropriate, after enrichment. This means that the joining component 112 is able to use any relevant enrichment data in the enriched events for the purposes of identifying short-term correlations. However, it will be appreciated that in some contexts at least it may be possible to perform enrichment and correlation in any order or in parallel.

An observation database manager 114 (storage component) is shown having an input connected to receive events from the message queue 106. The observation database manager 114 retrieves events, and in particular enhanced (i.e. enriched and, where appropriate, joined) events from the message queue 106 and stores them in an observation delay line 116 (observation database). The observation delay line 116 may be a distributed database. The observation delay line 116 stores events on a longer time scale than events are stored in the message queue 106.

A batch enrichment engine 132 performs additional enrichment of the events in the observation delay line 116 over relatively long time windows and using large enrichment data sets. A batch enrichment framework 134 performs a batch enrichment process, in which events in the observation delay line 116 are further enriched. The timing of the batch enrichment process is driven by an enrichment scheduler 136 which determines a schedule for the batch enrichment process. Note that this batch enrichment is a second stage enrichment, separate from the first stage enrichment that is performed before events are stored in the observation delay line 116.

Figure 3:
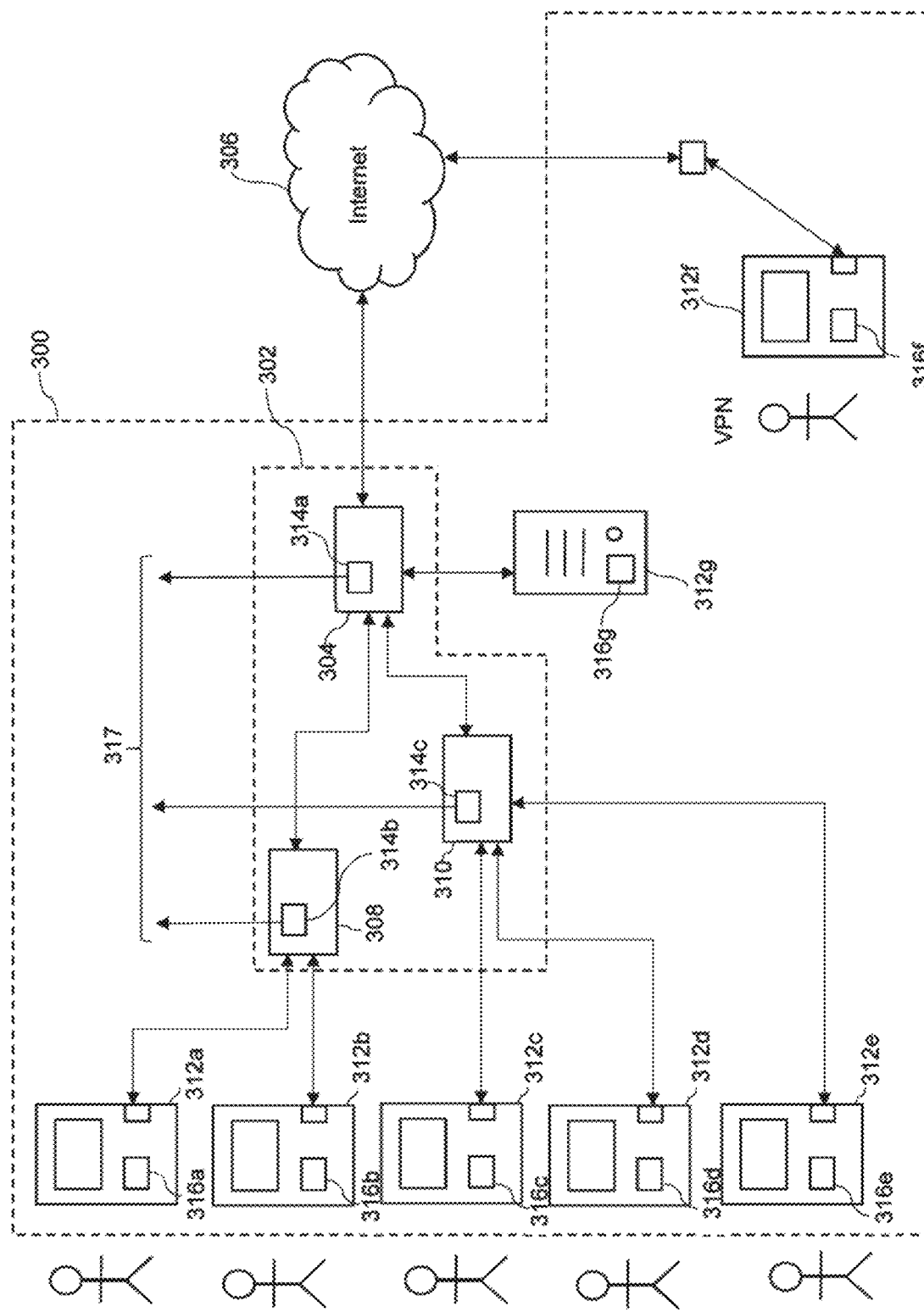
FIG. 3 shows a schematic block diagram of a network which may be subject to a cyber-security analysis.

Network and Endpoint Events:

FIG. 3 shows a schematic block diagram of an example network 300 which is subject to monitoring, and which is a private network. The private network 300 is shown to comprise network infrastructure, which can be formed of various network infrastructure components such as routers, switches, hubs etc. In this example, a router 304 is shown via which a connection to a public network 306 is provided such as the Internet, e.g. via a modem (not shown). This provides an entry and exit point into and out of the private network 300, via which network traffic can flow into the private network 300 from the public network 306 and vice versa. Two additional network infrastructure component 308, 310 are shown in this example, which are internal in that they only have connections to the public network 306 via the router 304. However, as will be appreciated, this is purely an example, and, in general, network infrastructure can be formed of any number of components having any suitable topology.

In addition, a plurality of endpoint devices 312a-312f are shown, which are endpoints of the private network 300. Five of these endpoints 312a-312e are local endpoints shown directly connected to the network infrastructure 302, whereas endpoint 312f is a remote endpoint that connects remotely to the network infrastructure 302 via the public network 306, using a VPN (virtual private network) connection or the like. It is noted in this respect that the term endpoint in relation to a private network includes both local endpoints and remote endpoints that are permitted access to the private network substantially as if they were a local endpoint. The endpoints 312a-312f are user devices operated by users (client endpoints), but in addition one or more server endpoints can also be provided. By way of example, a server 312g is shown connected to the network infrastructure 302, which can provide any desired service or services within private network 300. Although only one server is shown, any number of server endpoints can be provided in any desired configuration.

For the purposes of collecting raw network data, a plurality of network data capture components 314a-314c are provided. These can for example be network taps. A TAP is a component which provides access to traffic flowing through the network 300 transparently, i.e. without disrupting the flow of network traffic. Taps are non-obtrusive and generally non-detectable. A TAP can be provided in the form of a dedicated hardware TAP, for example, which is coupled to one or more network infrastructure components to provide access to the raw network data flowing through it. In this example, the taps 314a, 314b and 314c are shown coupled to the network infrastructure component 304, 308 and 310 respectively, such that they are able to provide, in combination, copies 317 of any of the raw network data flowing through the network infrastructure 302 for the purposes of monitoring. It is this raw network data that is processed into structured network events for the purpose of analysis.

Figure 2:
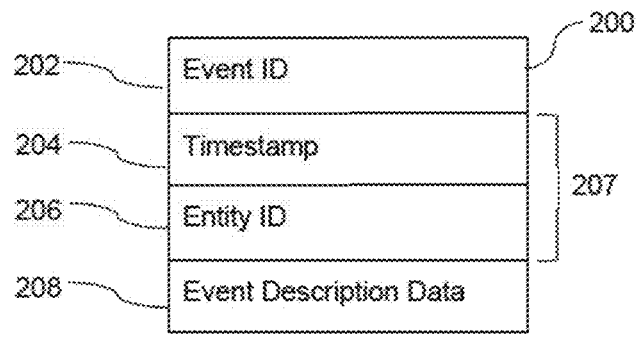
FIG. 2 shows a highly schematic representation of a network event.

FIG. 2 shows a schematic illustration of certain high level structure of a network event 200.

The network event 200 is shown to comprise a timestamp 204, an entity ID 206 and network event description data (network event details) 208. The timestamp 204 and entity ID 206 constitute metadata 207 for the network event details 208.

The network event description data 208 provides a network event description. That is, details of the activity recorded by the network event that has occurred within the network being monitored. This activity could for example be the movement of a network packet or sequence of network packets through infrastructure of the network, at a particular location or at multiple locations within the network.

The network event data 208 can for example comprise one or more network event type indicators identifying the type of activity that has occurred. The entity ID 206 is an identifier of an entity involved in the activity, such as a device, user, process etc. Where multiple entities are involved, the network event can comprise multiple network event IDs. Two important forms of entity ID are device ID (e.g. MAC address) and network address (e.g. IP address, transport address (IP address plus port) etc.), both of which may be included in a network event.

As well as being used as part of the analysis (in conjunction with the timestamps 204), entity IDs 206 and network event description data 208 can be used as a basis for querying enrichment data sources for enrichment data.

The timestamp 204 denotes a timing of the activity by the network event 200. Such timestamps are used as a basis for associating different but related network events, together with other information in the network event 200 such as the entity ID 206 or IDs it contains.

The network event 200 can have structured fields in which this information is contained, such as a timestamp field, one or more entity ID fields and one more network event description fields.

The network event 200 is shown to comprise a network event identifier (ID) 202 which uniquely identifies the network event 200.

Returning to FIG. 3, for the purpose of collecting endpoint data, endpoint monitoring software (code) is provided which is executed on the endpoints of the network 300 to monitor local activity at those endpoints. This is shown in the form of endpoint agents 316a-316g (corresponding to endpoint agents 316 in FIG. 1) that are executed on the endpoints 312a-312g respectively. This is representative of the fact that endpoint monitoring software can be executed on any type of endpoint, including local, remote and/or server endpoints as appropriate. This monitoring by the endpoint agents is the underlying mechanism by which endpoint events are collected within the network 300.

Figure 4:
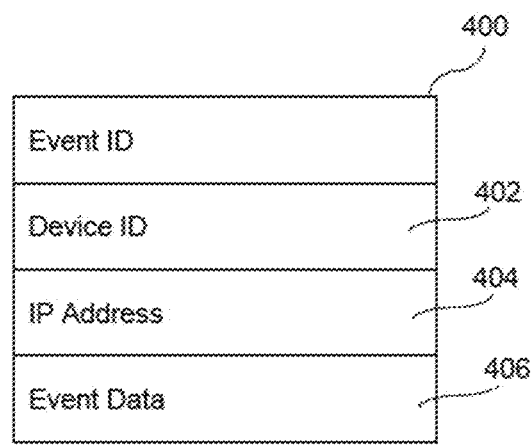
FIG. 4 shows a highly schematic representation of an endpoint event.

FIG. 4 shows a schematic illustration of a certain high level structure of an endpoint event 400.

The endpoint event 400 is shown to comprise at least one endpoint identifier, such as a device identifier (e.g. MAC address) 402 and network (e.g. IP) address 404 of the endpoint to which it relates, and endpoint event description data 406 that provides details of the local activity at the endpoint in question that triggered the creation of the endpoint event 400.

One example of endpoint activity that may be valuable from a cyber defence perspective is the opening of a connection at an endpoint. For example, a TCP/IP connection is uniquely defined by a five-tuple of parameters: source IP address (IP address of the endpoint being monitored), source port, destination IP address (IP address of an e.g. external endpoint to which the connection is being opened), destination port, and protocol. A useful endpoint event may be generated and provided to the platform for analysis when an endpoint opens a connection, in which the five-tuple defining the connection is recorded, and well as, for example, an indication of a process (application, task, etc.) executed on the endpoint that opened the connection.

As noted, one of the key features of the present cyber defence platform is its ability to link together interrelated network and endpoint events. Following the above example, by linking an endpoint event recording the opening of a connection and details of the process that opened it to network events recording the flow of traffic along that connection, it becomes possible to link specific flows of network traffic to that specific process on that endpoint.

Additional examples of endpoint information that can be captured in endpoint events include information about processes running on the endpoint (a process is, broadly, a running program), the content of files on the endpoint, user accounts on the endpoint and applications installed on the endpoint. Again, such information can be linked with any corresponding activity in the network itself, to provide a rich source of information for analysis.

Such linking can occur within the platform both as part of the real-time joining performed by the joining component 112.

However, network and endpoint events can also be linked together as part of the analysis performed by the analysis engine that is inherently able to consider links between events over longer time-scales, as will now be described.

Event Driven, Case-Based Analysis:

Returning to FIG. 1, the analysis engine, labelled 118, is shown having inputs connected to the event queue 106 and the observation delay line 116 for receiving events for analysis. The events received at the analysis engine 118 from the event queue 106 directly are used, in conjunction with the events stored in the observation delay line 116, as a basis for a sophisticated cyber security analysis that is applied by the analysis engine 118. Queued events as received from the message queue 106 permit real-time analysis, whilst the observation database 116 provides a record of historical events to allow threats to be assessed over longer time scales as they develop.

The analysis applied by analysis engine 118 is an event-driven, case-based analysis as will now be described.

As indicated above, the analysis is structured around cases herein. Cases are embodied as case records that are created in an experience database 124 (which may also be a distributed database).

Case creation is driven by events that are received at the analysis engine from the message queue 106, in real-time or near-real time.

Case creation can also be driven by events that are stored in the observation delay line 116. For example, it may be that an event is only identified as potentially threat-related when that event has been enriched in the second stage enrichment.

Once created, cases are developed by matching subsequent events received from the message queue 106 to existing cases in the experience database 124.

Events stored in the observation delay line 116 may also be matched to existing cases. For example, it may be that the relevance of a historic event only becomes apparent when a later event is received.

Thus, over time, a significant case will be populated with a time sequence of interrelated events, i.e. events that are potentially related to a common security threat, and as such exhibit a potential threat pattern.

Incoming events can be matched to existing cases using defined event association criteria, as applied to the content of the events—in particular the timestamps, but also other information such as entity identifiers (device identifier, IP address etc.). These can be events in the event queue 106, the observation delay line 116, or spread across both. Three key pieces of metadata that are used as a basis for linking events in this way are:

timestamps,
endpoint devices, and/or specific endpoint information such as:
  endpoint host name
  endpoint open sockets
IP address.

These can be multiple pieces of metadata of each type, for example source and destination IP addresses. Such metadata of cases is derived from the event or events on which the case is based. Note the above list is not exhaustive, and the types of data can be used as a basis for event linking.

For example, events may be associated with each other based on IP address where a source IP address in one event matches a destination IP address in another, and those events are within a given time window. IP addresses provide one mechanism by which endpoint events can be matched with related network events.

As another example, open sockets on an endpoint are a valuable piece of information in this context, as they are visible to the endpoint agent on the endpoint and associate specific processes running on that endpoint with specific network connections ("conversations"). That is, a socket associated with a process running on an endpoint (generally the process that opened the socket) can be associated with a specific five-tuple at a particular moment in time. This in turn can be matched to network activity within that conversation, for example by matching the five-tuple to the header data of packets tapped from the network. This in turn allows that network activity to be matched to a specific socket and the process associated with it. The endpoint itself can be identified by host name, and the combination of host name, five tuple and time is unique (and in many cases the five tuple and time will be unique depending on the network configuration and where the communication is going). This may also make use of the time-stamps in the network and endpoint events, as the association between sockets and network connections is time limited, and terminates when a socket is closed.

As noted already, in networking, a five-tuple is a tuple of (source IP, destination IP, source port, destination port, transport protocol). This uniquely identifies a network connection within relatively small time windows. In order to match events based on network connection, a hash of the five tuple can be computed from all network data and from endpoint process connection data (data relating to the network conversations individual processes on the endpoint are engaged in). By ensuring that all endpoint data also contains the host name (derived from the endpoint software), this allows any network event to be correlated with any endpoint event (network 5 tuple hash->endpoint 5 tuple hash->host name) and vice versa. This provides an efficient mechanism for linking specific network connections to specific programs (processes). Such techniques can also be used to link network activity to other event description data, e.g. a specific user account on an endpoint.

As noted, each case is assigned at least one threat score, which denotes the likelihood of the threat hypothesis (or threat hypotheses) to which the case relates. Significance in this context is assessed in terms of threat scores. When the threat score for a case reaches a significance threshold or meets some other significance condition, this causes the case to be rendered accessible via a case user interface (UI) 126.

Access to the cases via the case UI 126 is controlled based on the threat scores in the case records in the experience database 124. A user interface controller (not shown) has access to the cases in the experience database 124 and their threat scores, and is configured to render a case accessible via the case UI 126 in response to its threat score reaching an applicable significance threshold.

Such cases can be accessed via the case UI 126 by a human cyber defence analyst. In this example, cases are retrieved from the experience database 124 by submitting query requests via a case API (application programming interface) 128. The case (UI) 126 can for example be a web interface that is accessed remotely via an analyst device 130.

Thus within the analysis engine there are effectively two levels of escalation: —

Case creation, driven by individual events that are identified as potentially threat-related.

Escalation of cases to the case UI 126, for use by a human analyst, only when their threat scores become significant, which may only happen when a time sequence of interrelated events has been built up over time As an additional safeguarding measure, the user interface controller may also escalate a series of low-scoring cases related to a particular entity to the case UI 126. This is because a series of low-scoring cases may represent suspicious activity in themselves (e.g. a threat that is evading detection). Accordingly, the platform allows patterns of low-scoring cases that are related by some common entity (e.g. user) to be detected, and escalated to the case UI 126. That is, information about a set of multiple cases is rendered available via the case US 126, in response to those cases meeting a collective significance condition (indicating that set of cases as a whole is significant).

The event-driven nature of the analysis inherently accommodates different types of threats that develop on different time scales, which can be anything from seconds to months. The ability to handle threats developing on different timescales is further enhanced by the combination or real-time and non-real time processing within the system. The real-time enrichment, joining and providing of queued events from the message queue 106 allows fast-developing threats to be detected sufficiently quickly, whilst the long-term storage of events in the observation delay line 116, together with batch enrichment, provide a basis for non-real time analysis to support this.

The above mechanisms can be used both to match incoming events from the message queue 106 and events stored in the observation delay line 116 (e.g. earlier events, whose relevance only becomes apparent after later event(s) have been received) to cases. Appropriate timers may be used to determine when to look for related observations in the observation delay line 116 based on the type of observation, after an observation is made. Depending on the attacker techniques to which a particular observation relates, there will be a limited set of possible related observations in the observation delay line 116. These related observations may only occur within a particular time window after the original observation (threat time window). The platform can use timers based on the original observation type to determine when to look for related observations. The length of the timer can be determined based on the threat hypothesis associated with the case.

Analysis Framework:

The analysis engine is shown to comprise a machine reasoning framework 120 and a human reasoning framework 122. The machine reasoning framework 120 applies computer-implemented data analysis algorithms to the events in the observation delay line 116, such as ML techniques.

Individual observations may be related to other observations in various ways but only a subset of these relationships will be meaningful for the purpose of detecting threats. The analysis engine 118 uses structured knowledge about attacker techniques to infer the relationships it should attempt to find for particular observation types.

This can involve matching a received event or sets of events to known tactics that are associated with known types of attack (attack techniques). Within the analysis engine 118, a plurality of analysis modules ("analytics") are provided, each of which queries the events (and possibly other data) to detect suspicious activity. Each analytic is associated with a tactic and technique that describes respective activity it can find. A hypothesis defines a case creation condition as a "triggering event", which in turn is defined as a specific analytic result or set of analytic results that triggers the creation of a case (the case being an instance of that hypothesis). A hypothesis also defines a set of possible subsequent or prior tactics or techniques that may occur proximate in time to the triggering events (and related to the same, or some of the same, infrastructure) and be relevant to proving the hypothesis. Because each hypothesis is expressed as tactics or techniques, there may be many different analytics that can contribute information to a case. Multiple hypotheses can be defined, and cases are created as instances of those hypotheses in dependence on the analysis of the events. Tactics are high level attacker objectives like "Credential Access", whereas techniques are specific technical methods to achieve a tactic. In practice it is likely that many techniques will be associated with each tactic.

For example, it might be that after observing a browser crashing and identifying it as a possible symptom of a "Drive-by Compromise" technique (and creating a case in response), another observation proximate in time indicating the download of an executable file may be recognized as additional evidence symptomatic of "Drive-by Compromise" (and used to build up the case). Drive-by Compromise is one of a number of techniques associated with an initial access tactic.

As another example, an endpoint event may indicate that an external storage device (e.g. USB drive) has been connected to an endpoint and this may be matched to a potential a "Hardware Additions" technique associated with the initial access tactic. The analysis engine 118 then monitors for related activity such as network activity that might confirm whether or not this is actually an attack targeting the relevant infrastructure.

This is performed as part of the analysis of events that is performed to create new cases and match events to existing cases. As indicated, this can be formulated around the "MITRE ATT&CK framework". The MITRE ATT&CK framework is a set of public documentation and models for cyber adversary behaviour. It is designed as a tool for cyber security experts. In the present context, the MITRE framework can be used as a basis for creating and managing cases. In the context of managing existing cases, the MITRE framework can be used to identify patterns of suspect (potentially threat-related behaviour), which in turn can be used as a basis for matching events received at the analysis engine 118 to existing cases. In the context of case creation, it can be used as a basis for identifying suspect events, which in turn drives case creation. This analysis is also used as a basis for assigning threat scores to cases and updating the assigned threat scores as the cases are populated with additional data. However it will be appreciated that these principles can be extended to the use of any structured source of knowledge about attacker techniques. The above examples are based on tactics and associated techniques defined by the Mitre framework. The described techniques are not limited to Mitre, and can be applied with other forms of tactics/techniques, e.g. in alternative (including bespoke) threat models, or tactics/techniques that are learned via supervised or unsupervised machine learning processing (or other pattern recognition or statistical analysis methods). 'Learned' tactics or techniques characterize potential attacks in machine-understandable terms, which may or may not be interpretable to a human. Tactics/techniques may for example be learned by training one or more models on existing or synthetic attack data, and/or from data learned in recording human analyst behaviour.

Case Content:

Each case record is populated with data of the event or events which are identified as relevant to the case. Preferably, the events are captured within the case records such that a timeline of the relevant events can be rendered via the case UI 126. A case provides a timeline of events that have occurred and a description of why it is meaningful, i.e. a description of a potential threat indicated by those events.

In addition to the event timeline, a case record contains attributes that are determined based on its constituent events. Four key attributes are:
people (users)
processes
devices
network connections A case record covering a timeline of multiple events may relate to multiple people, multiple devices and multiple users. Attribute fields of the case record are populated with these attributed based on its constituent events.

A database case schema dictates how cases are created and updated, how they are related to each other, and how they are presented at the case UI 126.

Figure 5:
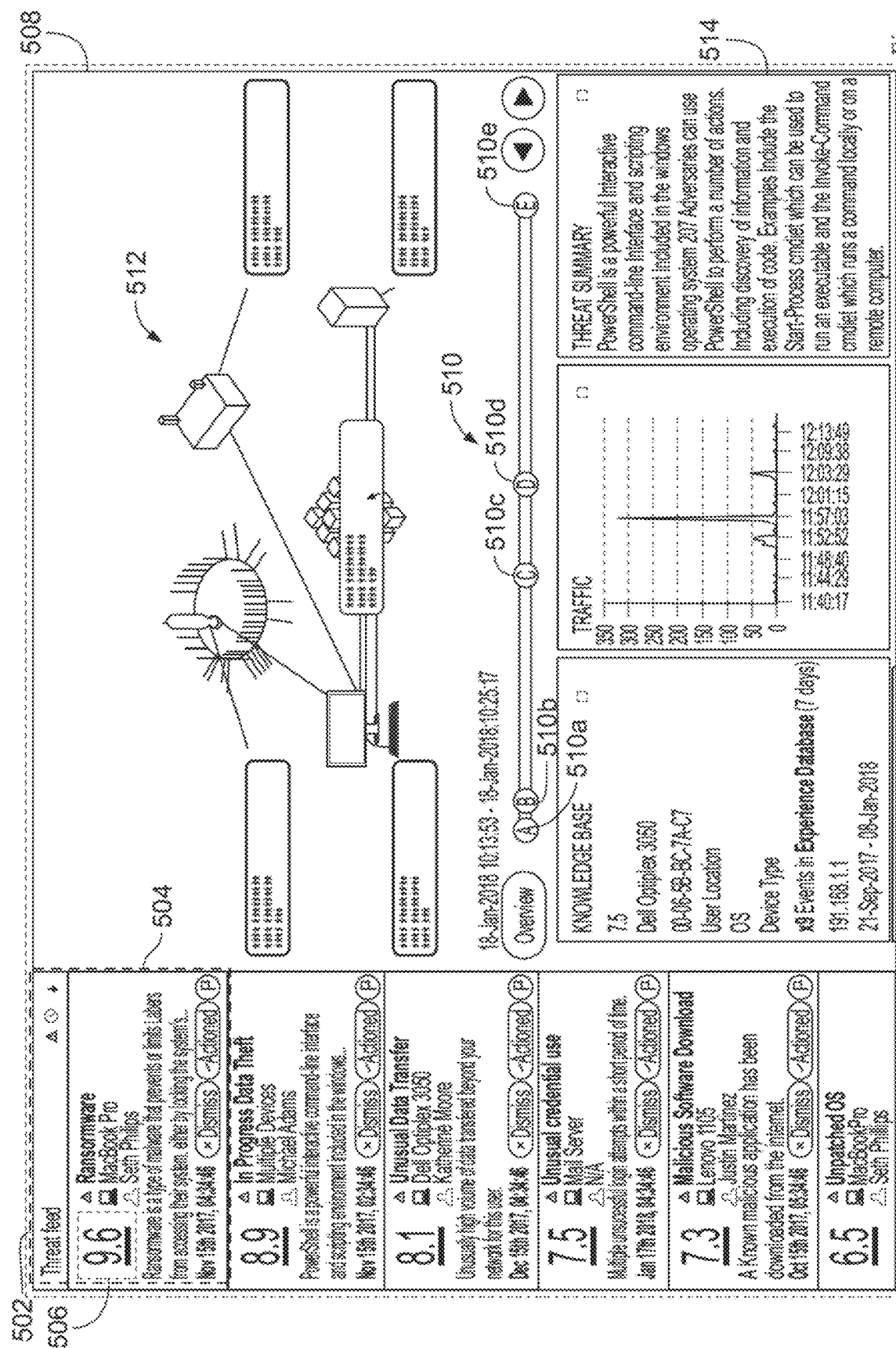
FIG. 5 shows an example layout of a case user interface.
Figure 5A:
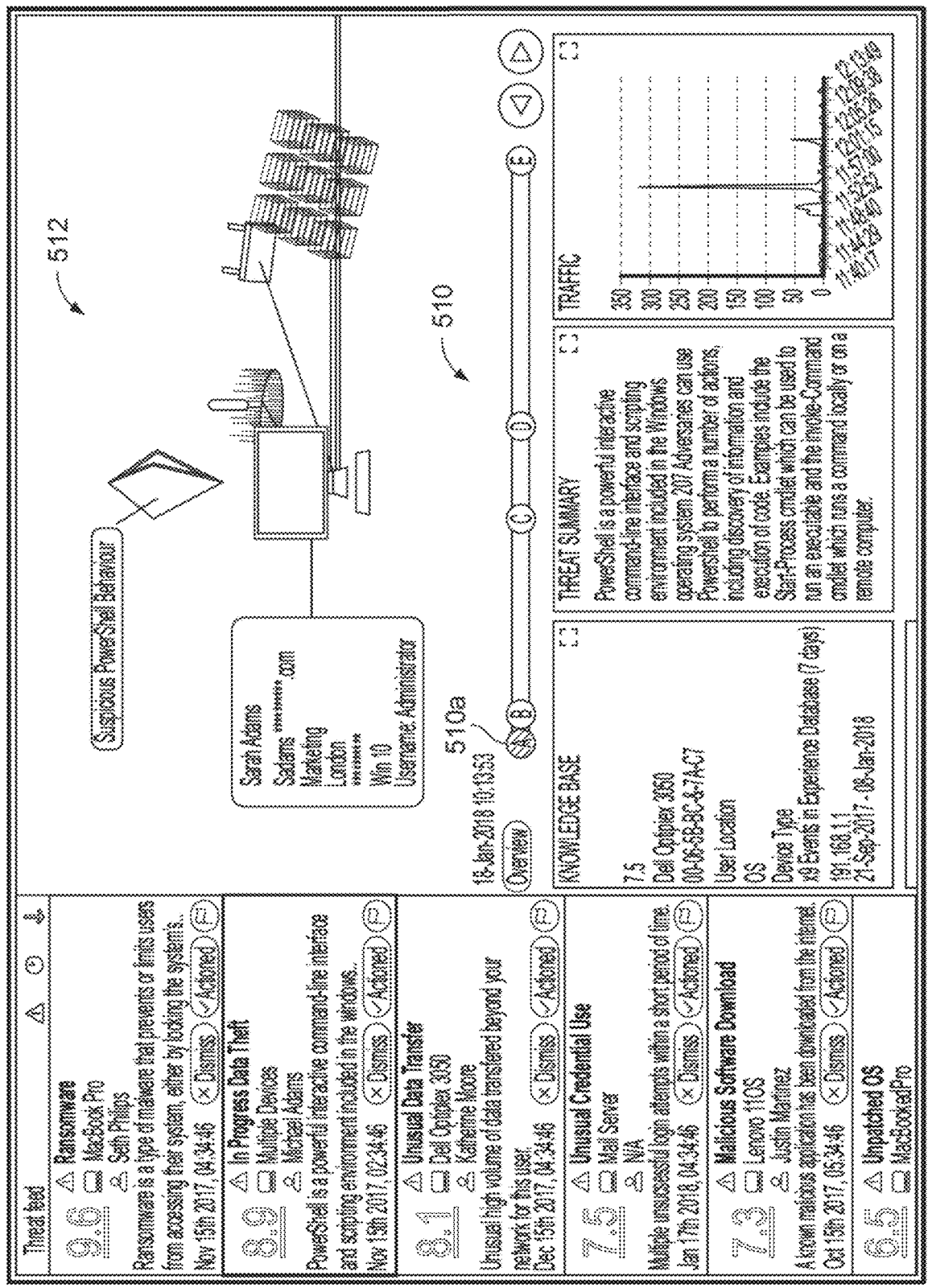
FIGS. 5a to 5e shows a case user interface dynamically responding to a series of user inputs.
Figure 5B:
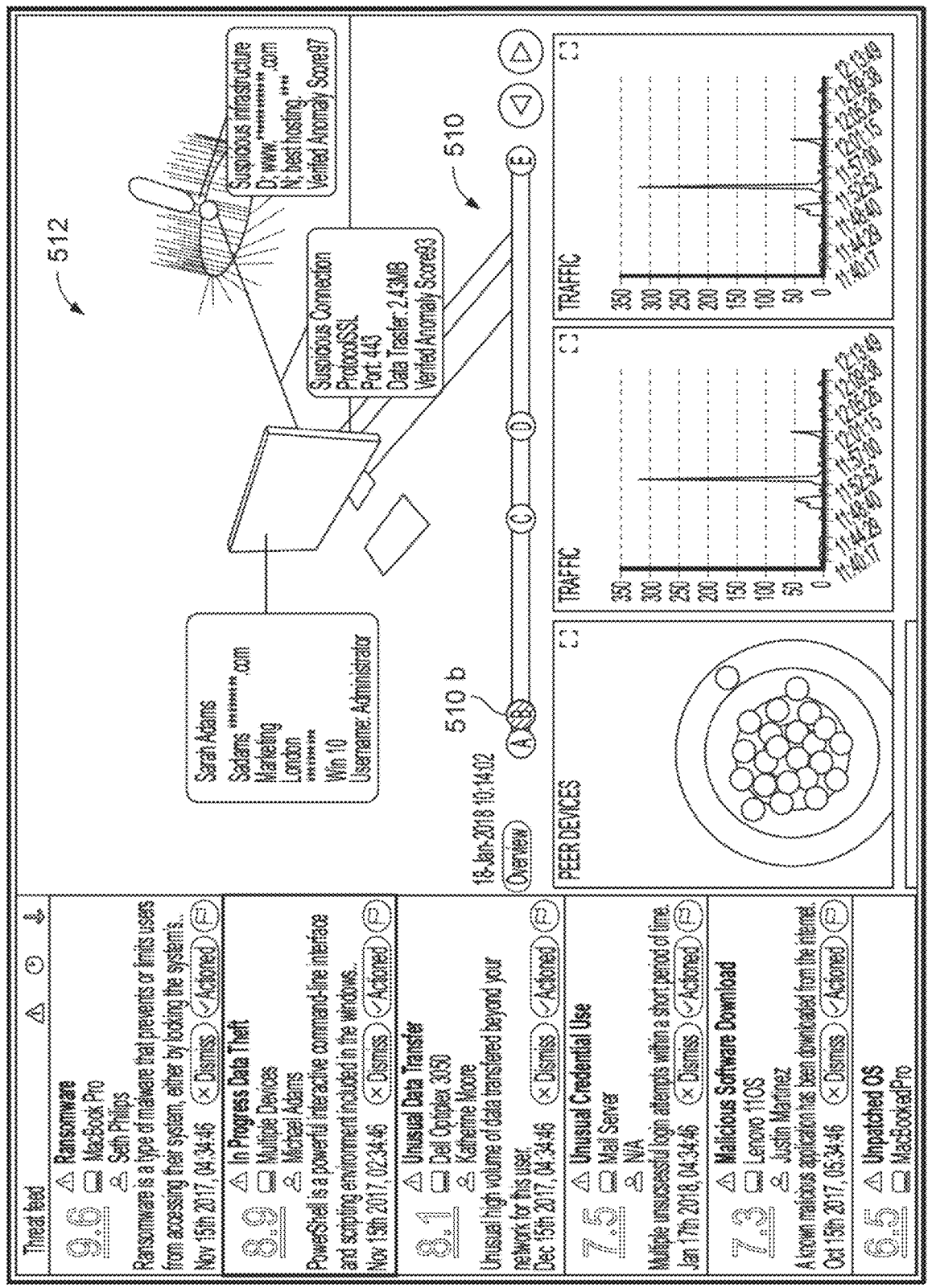
Figure 5C:
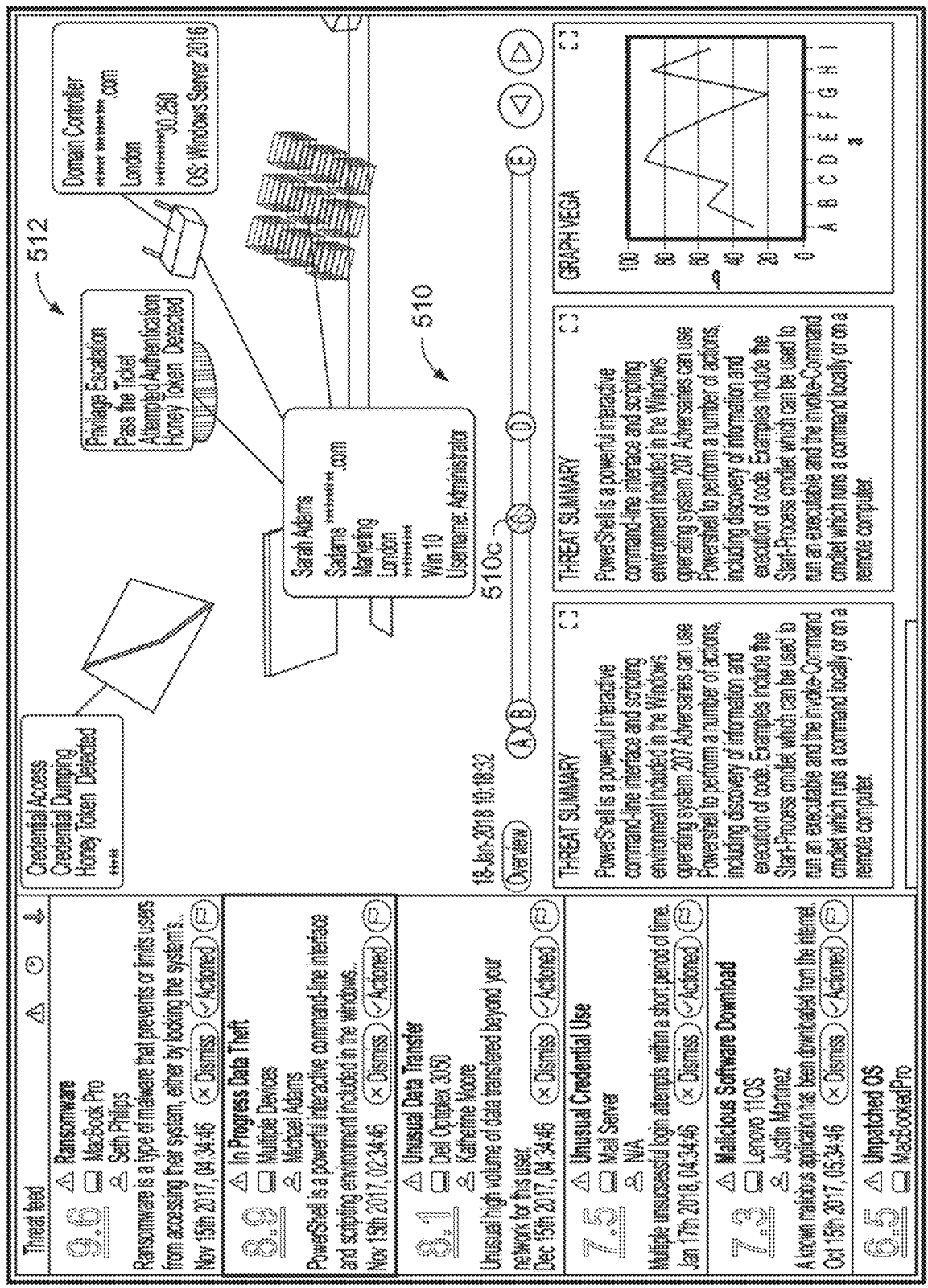
Figure 5D:
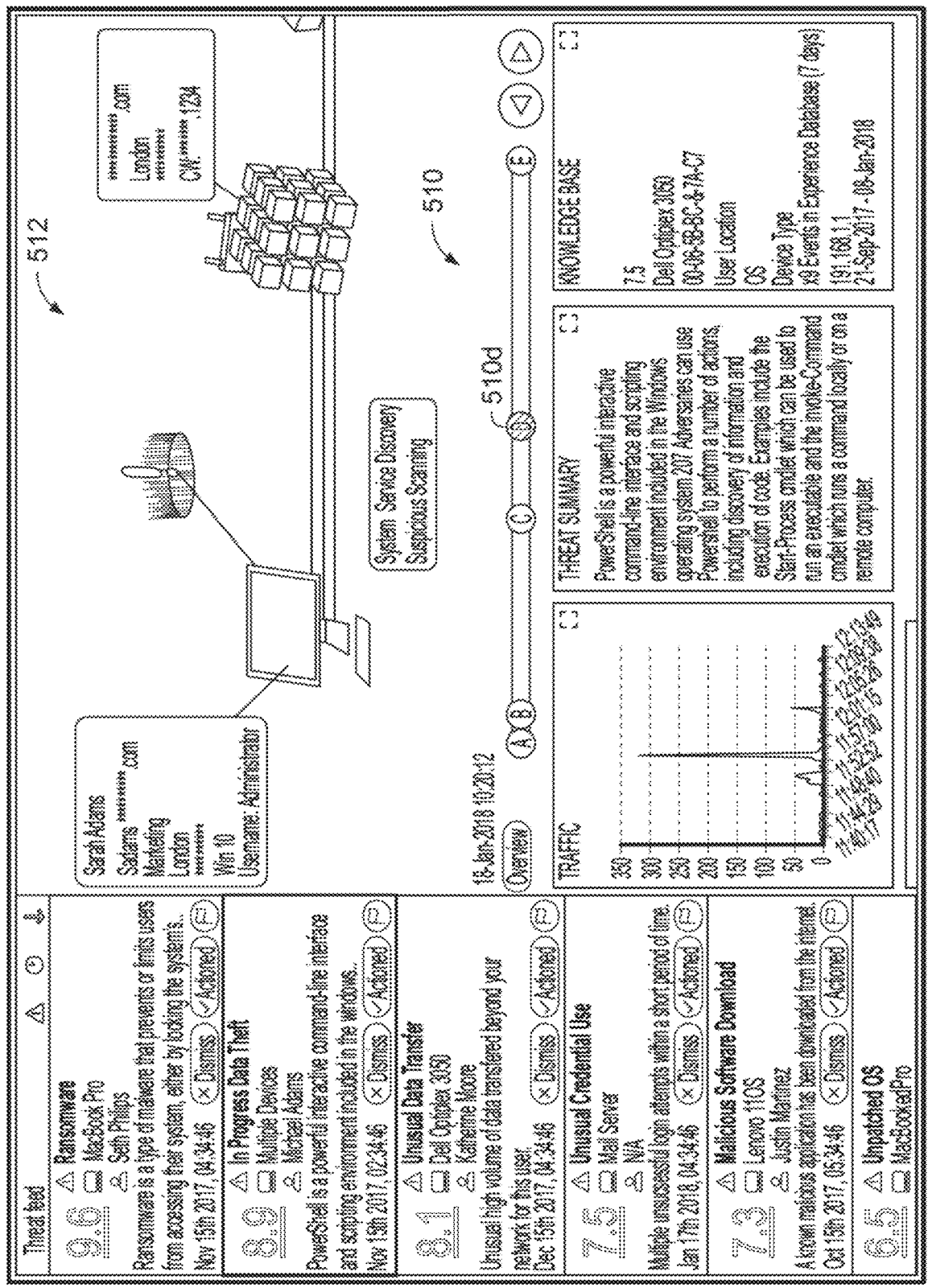
Figure 5E:
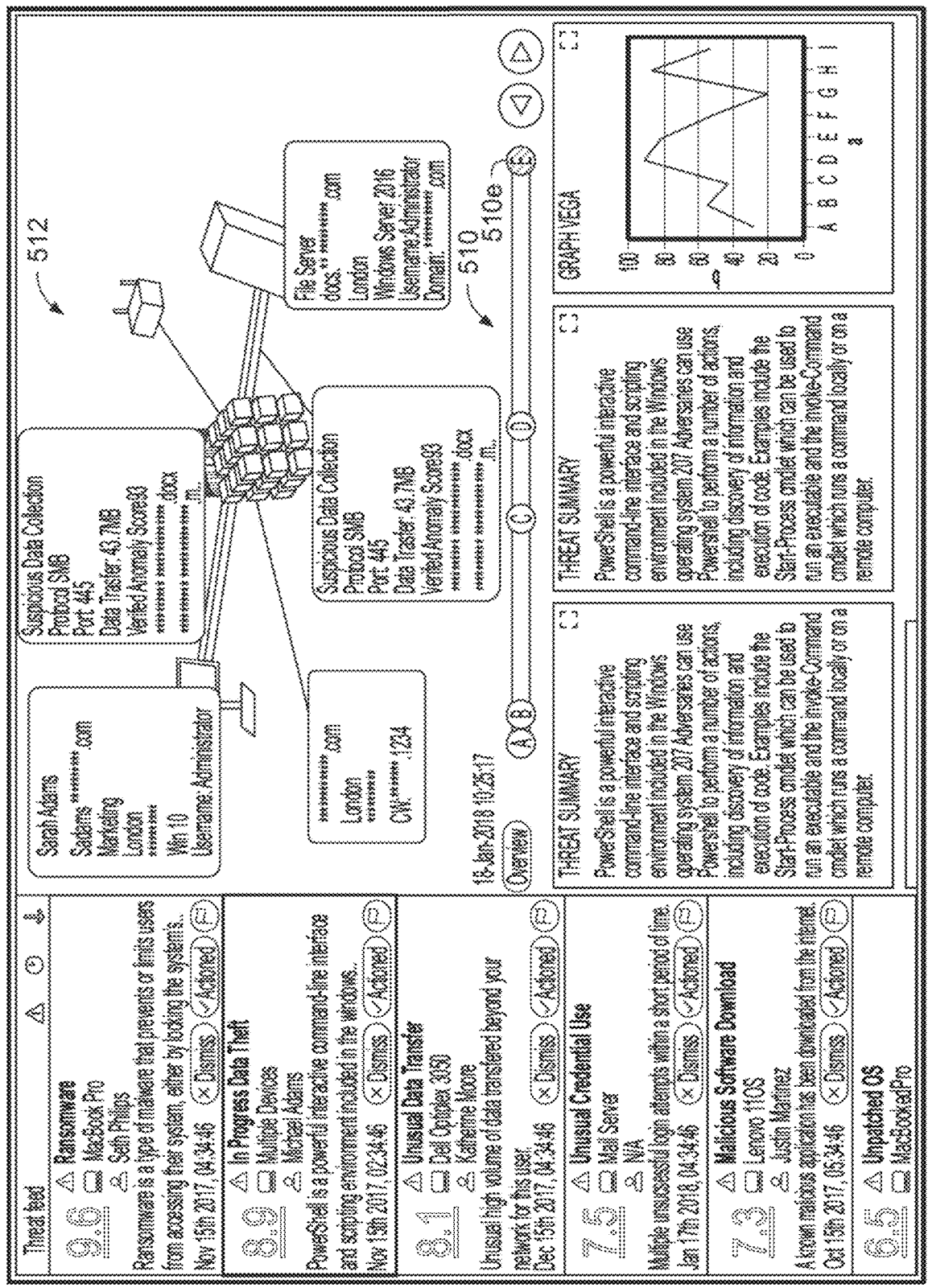

Case User Interface:

FIG. 5 shows an example of a page rendered by the case UI 126 at the analyst device 130. A list of cases 502 is shown, each of which is selectable to view further details of the case in question. Cases are only displayed in the case list 502 if their respective threats scores have reached the required thresholds. The cases in the case list 502 are shown ordered according to threat score. By way of example, the first case 504 in the case list 502 has a threat score of 9.6 (labelled as element 506). Further details of the currently selected case are shown in a region 508 adjacent to the case list 502. In particular, a timeline 510 of the events on which the case is based is shown. That is, the events with which the case is populated in the experience database 124. In addition, a graphical illustration 512 of network components to which those events relate is shown in association with the timeline 510. This can, for example, include endpoints, infrastructure components, software components and also external components which components of the network are in communication with. Additional information that is relevant to the case is also shown, including a threat summary 514 that provides a natural language summary of the threat to which the case relates. This additional information is provided in the form of "widgets" (separable threat information elements), of which the threat summary 514 is one. A visual (or other alert) may be generated when the threat score reaches a certain threshold. For example, a visual alert may be generated by adding a visual indicator of a case to the case list 502.

As shown in FIGS. 5A through 5E, the timeline 510 comprises selectable elements corresponding to the underlying events, which are labelled 510a to 510e respectively. This can be seen, selecting these timeline elements causes the accompanying graphical representation 512 to be updated to focus on the corresponding network components. The widgets below the timeline are also updated to show the information that is most relevant to the currently selected timeline element.

Enrichment Micro Services:

Returning to FIG. 1, micro services 138 are provided, from which enrichment data can be obtained, both by the batch enrichment framework 134 (second stage enrichment) and the enrichment component 110 (first stage enrichment). These can for example be cloud services which can be queried based on the events to obtain relevant enrichment data. The enrichment data can be obtained by submitting queries to the micro services based on the content of the events. For example, enrichment data could be obtained by querying based on IP address (e.g. to obtain data about IP addresses known to be malicious), file name (e.g. to obtain data about malicious file names) etc.

Hunting Ground:

In addition to the case UI 126, a "hunting" UI 140 is provided via which the analyst can access recent events from the message queue 106. These can be events which have not yet made it to the observation delay line 116, but which have been subject to first stage enrichment and correlation at the event enhancement system 108. Copies of the events from the message queue 106 are stored in a hunting ground 142, which may be a distributed database and which can be queried via the hunting UI 140. This can for example be used by an analyst who has been alerted to a potential threat through the creation of a case that is made available via the case UI 126, in order to look for additional events that might be relevant to the potential threat.

In addition, copies of the raw network data itself, as obtained through tapping etc., are also selectively stored in a packet store 150. This is subject to filtering by a packet filter 152, according to suitable packet filtering criteria, where it can be accessed via the analyst device 130. An index 150a is provided to allow a lookup of packet data 150b, according to IP address and timestamps. This allows the analyst to trace back from events in the hunting ground to raw packets that relate to those events, for example.

Enhanced Endpoint Monitoring

Figure 6:
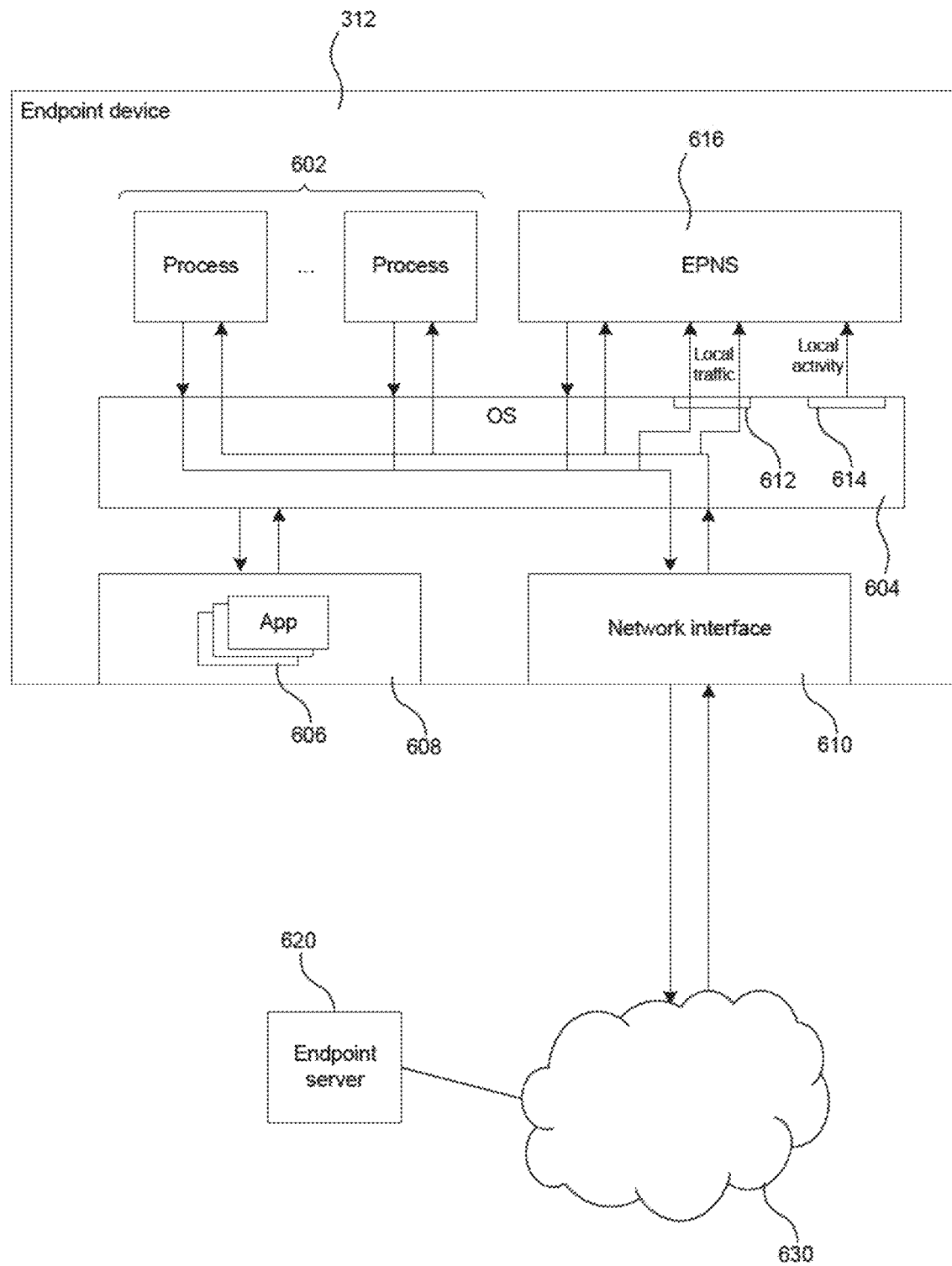
FIG. 6 shows a block diagram of an endpoint device running an endpoint agent.

FIG. 6 shows a schematic block diagram of an endpoint device 312 on which an enhanced form of endpoint agent is executed. The enhanced endpoint agent is denoted by reference numeral 616 and may also be referred to herein as an endpoint network sensor (EPNS).

Whilst the endpoint agent 316 of FIG. 1 is deployed for the purpose of endpoint activity monitoring, the EPNS 616 is additionally responsible for monitoring local network traffic. That is, in addition to collecting endpoint data, the EPNS 616 additionally monitors local network traffic to and from the endpoint device 312 in order to collect network data locally at the endpoint device 312. Local network traffic monitoring by the EPNs 616 reduces the reliance on network TAPs and other centralized network monitoring components. The description below may refer to the EPNS 616 as the endpoint agent 616 or the network sensor 616 for conciseness.

A set of processes 602 is shown to be executed on the endpoint device 312 and the EPNS collects at least some of the endpoint data by monitoring local activity by the processes 602.

One option is for the EPNS 616 to collect and send copies of all incoming/outgoing network packets for server-side processing, in the manner of a TAP or mirror (but sending a full copy of only its 'raw' local network traffic). In this case, the local network traffic copy would be sent to the coal face producers 102 and/or standardizers 104 of FIG. 1 for pre-processing into structured events in the same way as raw network traffic received from dedicated monitoring components). However, to reduce transmission overhead, some or all of the functions of the coals face producers 102/standardizers 104 may be performed locally by the EPNS 616 instead. In such cases, the EPNS 616 instead transmits a more concise summary of its local traffic, in the form of structured network traffic metadata. The term 'network data' is used broadly, unless otherwise indicated, and does not necessarily imply 'raw' network data (in the context of EPNS reporting, network data can take the form of more-concise network metadata summarizing local network traffic).

In the following examples, the network data collected by the EPNS 616 takes the form of network traffic metadata summarizing its local network traffic. The EPNS 616 processes the incoming and outgoing local traffic in order to extract such metadata therefrom. The extracted metadata summarizes incoming and outgoing packets of the local traffic. The incoming and outgoing packets carry process data intended for and generated by the processes 602 respectively. The EPNS 616 transmits the extracted metadata to an endpoint server 620 for further processing. The endpoint server 620 forms part of the cybersecurity platform that provides a cybersecurity service implemented remotely from the endpoint device 312.

Herein, the terms "metadata" and "telemetry" are used interchangeably in relation to network traffic. In the present example, such telemetry includes header data of observed packets, but additionally summarizes their payload data to the extent possible. The telemetry does not include the full "raw" payload data but does summarize the data contained in the payloads of incoming and outgoing packets.

A key piece of network information is a connection or other "flow" identifier. As noted, a connection is defined by a tuple of (source IP address, source port, destination IP address, destination port, transport protocol). A "flow" generalizes the concept of a connection to connectionless protocols (see below). The opening of a connection or establishment of a flow is a key piece of information that can be used for threat detection and analytics. In the described examples, at a minimum, the EPNS 616 reports every flow that is established at the endpoint device 312 (see below for further details), preferably in combination with additional network associated with the flow. Examples of additional types of network metadata are described below.

Figure 17:
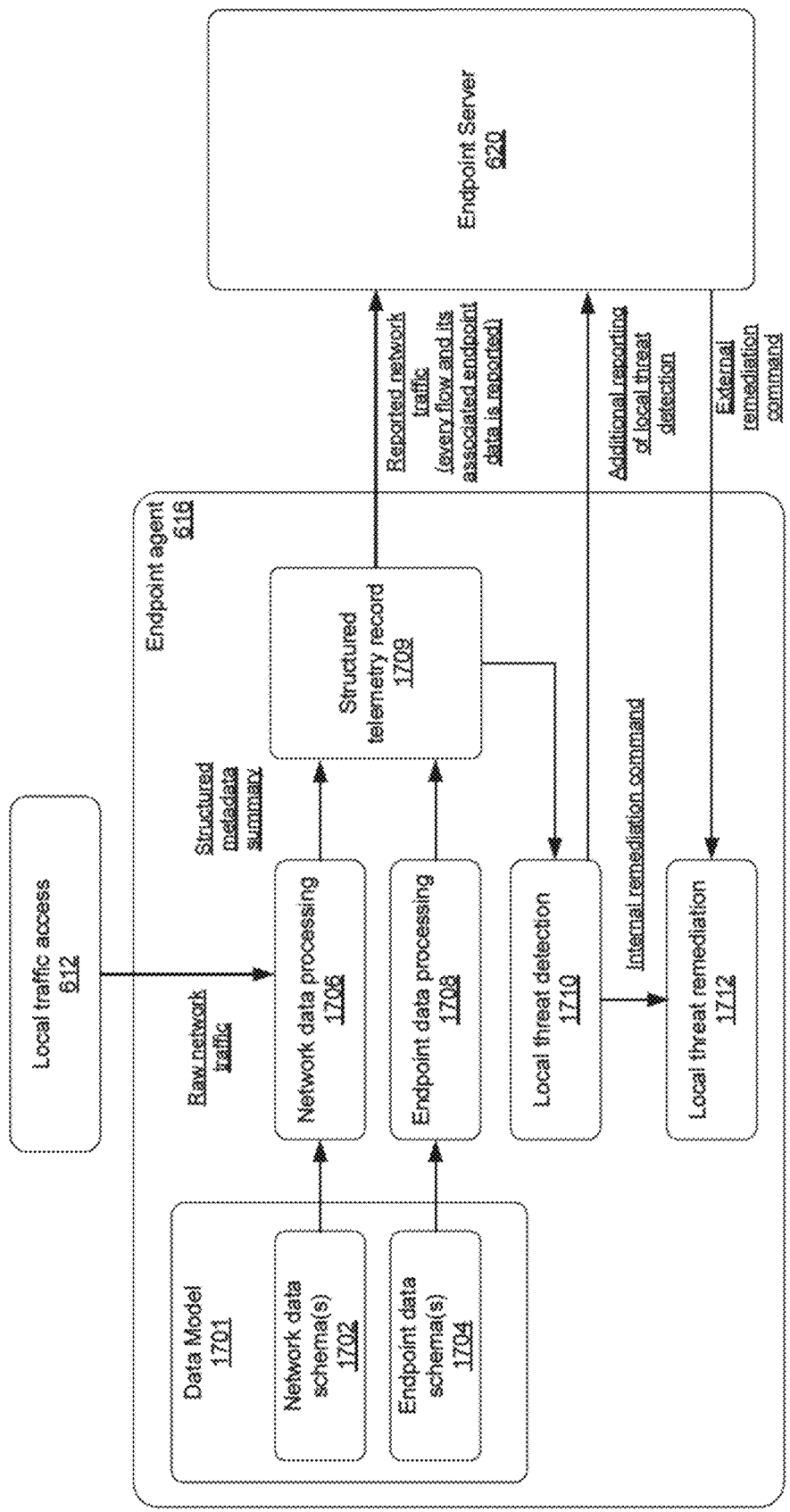
FIG. 17 shows a high-level functional block diagram of an advanced endpoint agent.

FIG. 17 shows a high-level functional block diagram of the endpoint agent 616 in one example implementation. The endpoint agent 616 is shown to comprise a network data processing component 1706, an endpoint data processing component 1708, a local threat detection component 1710, and a local threat remediation component 1712. The network data processing component 1706 receives a copy of the endpoint's raw network traffic, and processes the raw network traffic to detect the start of new network flows and to extract structured network metadata pertaining to new or existing network flows. Respective endpoint data is associated with each flow locally by the EPNS 616, in order to provide one or more structured telemetry records 1709 containing both structured network metadata and associated structured endpoint metadata pertaining to an identified flow. Every new flow that is identified by the EPNS 616 is reported to the endpoint server 620, along with a structured metadata summary of the network data carried in that flow and the associated endpoint data local to the EPNS 616 that has been linked to that flow locally by the EPNS 616.

In order to summarize the "raw" network data in an efficient way that is optimized for subsequent threat analysis, a data model 1701 may be rendered accessible to the EPNS 616. The data model 1701 may be stored locally at the endpoint device 312 accessible to the EPNS 616, or accessed by the EPNS 616 from a remote storage location. The data model 1701 comprises one or more network schemas 1702, which are formal data schemas applied to the raw network traffic and used to structure the network metadata in a queryable fashion. For example, different network schemes may be provided for different protocols (such as HTTP, TLS, SSH), meaning that the nature and extent of the network metadata that is generated may be different for different protocols. This may involve some form of "deep" packet analysis. The depth of the analysis may depend on factors such as the network protocol or protocols with which a given packet(s) is associated. Certain packets or parts may be disregarded if they are of no or limited analytical value. For example, encrypted packet contents may be disregarded.

For example, for packets carrying HTTP data, structured metadata elements that are extracted from the packets could include one or more of: an HTTP request method contained in a request, a response code returned by an HTTP server, a size (e.g. number of bytes) in the body of an HTTP request or response, the value of a user agent header, and HTTP authentication method used etc. HTTP is non-encrypted; hence these elements can be extracted from the plaintext application data contained in the packets. This involved full analysis of application-level data contained in the packets. For packets carried via TLS, the structured network metadata could include one or more of: TCP sequence number, a TLS server hostname, one or more TLS fingerprints, a TLS version etc.

For SSH, the extracted metadata elements could include one or more of a client SSH protocol version, a server SSH protocol version, an SSH client name, an SSH server name, comment text from an SSH client or server etc.

Other examples of extracted metadata elements include VLAN or MPLS label(s).

The selective extraction and structuring of network data performed by the EPNS 616 mirrors, at least to some extent, functions of the coal face producers 102 and standardization components 104 shown in FIG. 1. Therefore, the EPNS 616 can remove the need for the coal face producers 102 and/or standardization component 104, or reduce the extent to which those components 102, 104 are relied upon (as structured network events, in the form of network traffic records, are generated locally at the endpoint device 312).

The process of extracting metadata from the local traffic at the endpoint device 312 itself has several benefits. One aim of the local processing is to reduce the amount of network data that needs to be communicated to the endpoint server 620. The metadata does not duplicate the full contents of the incoming and outgoing packets at the endpoint device 312 but provides a sufficiently comprehensive summary to nonetheless be useful in a cybersecurity threat analysis. The use of such metadata in cybersecurity is known per se however existing systems require dedicated components such as network TAPs and appliances that are generally only suitable for deployment in certain networks. Their usefulness is therefore limited to monitoring only network traffic passing through such a network to/from endpoints connected to it directly or remotely using some tunnelling mechanisms such as a VPN connection. In the modern world, with an increasing emphasis on flexible remote access, the limitations of such existing systems are becoming increasingly significant.

Another significant benefit of implementing the EPNS 616 on the endpoint 312 itself is the ability to associate mutually related network events and endpoint events locally at the endpoint 312 itself. Whilst the platform of FIG. 1 that it described above is equipped to perform such linking server-side, such server-side linking is potentially less efficient and more error prone. For example, in the case that endpoint events are collected by endpoint agents and forwarded to the system whilst network traffic is monitored using tapping, the system will receive network and endpoint events from different sources. A large number such events may be received in the infrastructure required to perform the necessary server-side processing is significant. There is also more scope for a percentage of events being lost or delayed. Significant resources are also required to match large numbers of endpoint events and network events server-side.

The EPNS 616 has the benefit of being able to link local network traffic to endpoint activity based on local timing. The local timing of local network packets received at or sent from the endpoint 312 and the local timing of incident of endpoint activity can typically be determined highly accurately at the endpoint device 312 itself.

However, this is platform dependent. In some cases, the association is done by the operating system itself, and the endpoint agent simply needs to locate that information; in others it comes down to factors such as timing and connection tuple.

The EPNS 616 provides the extracted network traffic metadata to the endpoint server 620 in a series of records transmitted to it. Records containing such network traffic metadata may be referred to herein as network traffic records. Such records, when generated locally at the endpoint device 312 by the EPNS 616, may also be referred to as endpoint records (as described later, the EPNS 616 can be deployed in a system where network traffic records are collected using a combination of local and remote network monitoring). The endpoint records generated by the EPNS 616 are associated with endpoint data collected by the EPNS 616 based on local activity monitoring at the endpoint device 312. For example, it may be the case that the endpoint records are augmented or enriched with such endpoint data locally at the endpoint device 312 or it may be that the endpoint data is contained in separate records generated locally and linked to the network traffic records by the EPNS 616. In general, any combination of augmentation, enrichment, linking and/or any other mechanism that has the effect of associating network traffic records with related endpoint data may be implemented locally at the endpoint device 312 by the EPNS 616. The associated endpoint data is likewise communicated to the endpoint server 620.

Returning to FIG. 6, the endpoint 312 is shown to execute an operating system (OS) 604, on which the processes 602 and the EPNS 616 run. The processes 602 typically include instances of one or more applications 606 stored in computer storage 608 of the endpoint device 312. One function of the OS 604 is to manage the processes 604 and allocate resources to them. The OS 604 also regulates the flow of network traffic between a network interface 610 of the endpoint device 312 and the processes 602 and the EPNS 616.

In addition, the OS 604 provides a local traffic access function 612 (also shown in FIG. 17) and a local activity monitoring function 614. These may, for example, be provided as part of one or more application programming interfaces (APIs) of the OS 604. The EPNS 616 uses the local traffic access function 612 in order to obtain duplicate copies of all incoming and outgoing network packets received at the network interface 610. This includes network packets sent to and from the processes 602, carrying inbound and outbound process data respectively. The EPNS 616 may also receive duplicate copies of its own incoming and outgoing network packets. The EPNS 616 processes the duplicate packet in order to extract the network traffic metadata.

In addition, the EPNS 616 uses the local activity monitoring function 614 to monitor endpoint activity by the processes 602. Examples of the type of endpoint activity that may be monitored may include, but are not limited to, the opening of ports, the accessing of files etc. Such monitoring is used to determine endpoint data. The monitoring may be ongoing, even if the endpoint data is static. For example, processes may be monitored in order to link some activity by a process to one or more network packets. In that case, the endpoint data may take the form of a process identifier (ID) that is associated with a telemetry record(s) summarizing those packet(s) (and, conceivably other identifier(s) such as a file identifier is such information is available). Endpoint data can also include user information, such as details of a user account associated with an incident of network activity, or host information about the endpoint device 312. In that case, a telemetry record of the network activity may be associated with a user identifier. For example, the endpoint data collected by the EPNS 616 and associated with the network traffic records can comprise any combination of process, host and/or user data, for example. For example, with current operating system APIs, it is generally possible to obtain some or all of the following endpoint data for particular network packets: username, process details, parent process details, process path, process command line string. In the following examples, actions by the processes are monitored, in order to link such identifiers to network packets.

The endpoint device 312 is an endpoint of a packet-based network 630 to which it is connected to the network interface 610, and through which the incoming and outgoing network traffic flows. The packet-based network 630 could be a "closed" network such as an enterprise or corporate network (e.g. the private network 300 of FIG. 3). However, it could alternatively be an "open" network (such as the internet 306). Referring to FIG. 3, the network 630 could be the Internet 306 when the endpoint device 312 is "roaming", or the private network 300 when the endpoint device is "non-roaming".

Even when the endpoint device 312 is not currently connected to the private network 300 (whether directly or via a VPN connection), that does not necessarily mean that it poses no threat to the private network. For example, the endpoint device 312 could still contain sensitive data or, should the endpoint device 312 become infected with some form of malware, that could propagate into the private network 300 when the endpoint device 312 does subsequently connect to it. There are therefore significant benefits to being able to detect cybersecurity threats even when the endpoint device 312 is roaming.

The endpoint device 312 could, for example, take the form of a user device such as a laptop or desktop computer, tablet or smart phone etc. The primary function of a user device is to provide useful functions to a user of the device. Such functions are implemented by the processes 602. The EPNS 616 is deployed on such a user device to provide secondary network and endpoint monitoring functions and submit cybersecurity data (network metadata and associated endpoint data in the present example) to the cybersecurity platform for analysis.

Referring to FIG. 17, the EPNS 616 may also structure endpoint data according to the data model 1701. In this case, the data model 1701 includes one or more endpoint schemas 1704 that are used to structure "raw" endpoint data obtained via the OS. Raw endpoint data can be obtained from various sources/interfaces provided by the OS and, as noted, the nature and extent of endpoint data that is available will depend on the OS. The EPNS 616 extracts individual pieces of endpoint data from the raw endpoint data in a structured, queryable fashion, linking or otherwise associating those pieces of endpoint data with the network metadata elements to which they relate. Sources of raw endpoint data include, for example, OS event logs, alerts, performance data (e.g. CPU/memory usage by the processes 602), exceptions, browser extensions, process or thread queries etc.

Process details and/or other forms of endpoint data may be associated with an entire flow (e.g. TCP connection or UDP session) so that all the packets within the flow are linked to the processes. This is important because analysing collections of packets within a flow rather than just individual packets allows the system to reconstruct data that is spread across multiple packets. In the described examples, packets are analysed as part of a flow and process details are associated with the flow on the endpoint 312, by the EPNS 616. The server-side only ever sees the results of analysing a flow (individual packets are not processed by the server in the present examples, rather the server only receives summary data that has already been associated client-side with a specific flow). Here, 'analysing' refers to the processing of packets by the EPNS 616 to detect and report all new flows to which the endpoint device 312 is party, as they are established, and to extract and transmit structured network telemetry summarizing the network data carried in flows visible at the endpoint 312, in accordance with the data model 1701/schema(s), for use in server-side threat detection (analysing does not, in this context, refer to local threat detection; flows are not, for example, only selectively reported when the EPNS 616 considers them indicative of a threat, not is any form of local threat detection required; if local threat detection is performed, all flows are nevertheless reported independently of such local threat detection, e.g. to facilitate server-side triangulation-based detection of threats that may not be evident from a single-point threat analysis at the client device 312).

Centralized threat detection based on data reported from multiple endpoint sensors (and any other monitoring components) is beneficial, as it allows a greater range of threats to be identified (many threats are not immediately evident when only viewed locally at a single endpoint). For example, when two endpoints separately report a common connection or other "flow" between those endpoints, each endpoint will report a set of endpoint data local to that endpoint. De-duplication processing performed server side resulting in a single flow record associated with two sets of endpoint data from the different endpoints (see below for details). This richer information source might, in turn, allow a threat to be identified that is not immediately evident at either one of the endpoints. More generally, a centralized perspective allows threats to be detected or 'triangulated' from multiple sources.

Nevertheless, the EPNS 616 may be configured to additionally perform some level of localised threat detection (complementing the centralized processing), denoted by the local threat detection component 1710. Local threat detection can be based on the same linked network/endpoint data that is reported to the remote cybersecurity service or a more limited set of data provided to a local threat detection component of the EPNS 616. In response to detecting a local threat, the threat detection component can take various actions, such as generating an alert (e.g. visual alert) at the endpoint device 312, or generating a thread remediation command.

Locally-detected threats may be communicated by the local threat detection component 1710 of EPNS 616 to the remote cybersecurity service (the endpoint server 620 in this case). This is separate from, and in addition to the function of reporting of local network traffic, which more closely mirrors a network tap (in combination with a data extraction system) and is 'agnostic' to the threat level associated with the network traffic in that network traffic is reported independently of any local threat detection (that is, all network traffic is reported 'agnostically' EPNS 616 at the level of detail defined in the data model/schema(s)).

In addition, the EPNS 616 can include a remediation component 1712 that allows threat response/remediation measures to be implemented at the endpoint device 312. For example, threat remediation might comprise the EPNS 616 isolating the endpoint device 312 from the network 630. The remediation component may be configured to perform a threat remediation action at the endpoint device 312 responsive to an external command received from the remote cybersecurity service and/or an internal command from the local threat detection component 1710.

"Deduplication" Overview

When the endpoint network sensor 612 generates metadata about network traffic observed from the endpoint device's perspective in the above manner, two issues can arise.

Firstly, endpoint agents running on multiple devices that are communicating with one another will generate separate metadata relating to the same network traffic.

Secondly, endpoint agents running on devices whose traffic is captured by an appliance TAP (traffic access point) will generate metadata relating to the same network traffic as the metadata generated by an appliance.

Embodiments are described below that address both problems by "deduplicating" traffic as early as possible.

Figure 7:
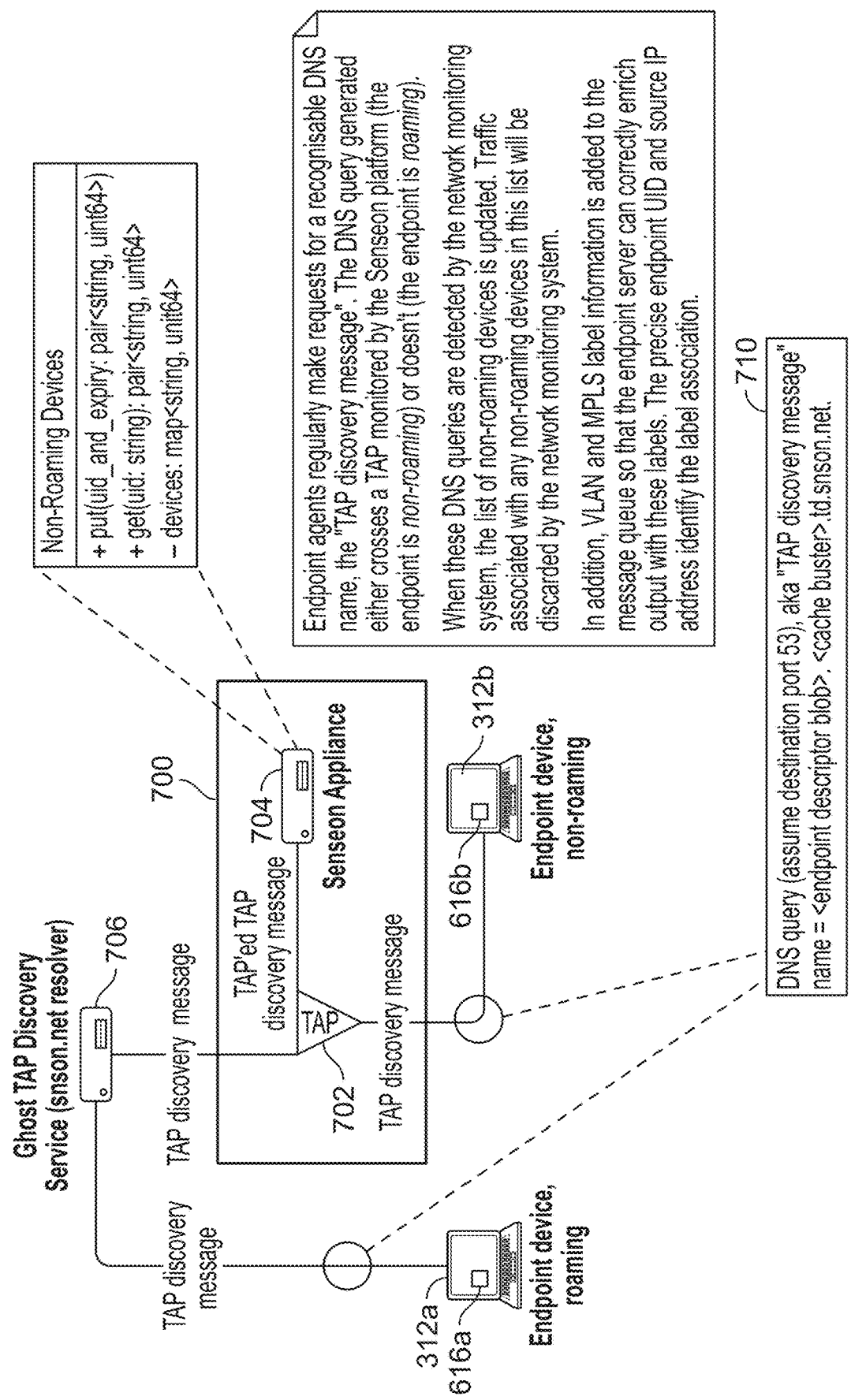
FIG. 7 shows multiple endpoints deployed in an example network topology that also includes a dedicated network monitoring system.

FIG. 7 shows a highly schematic block diagram of an example network topology, in which the EPNS 616 of FIG. 6 might be deployed at multiple endpoints.

As indicated, a conventional network monitoring arrangement might make use of one or more network TAPs (traffic access points) and/or other network monitoring components such as mirrors. A TAP is a component installed in a network and through which network traffic can flow transparently such that the TAP does not impede the normal operation of the network. For the purposes of network monitoring, the network TAP extracts network traffic data from the network traffic flowing through it. A network TAP may take the form of a hardware device having at least two network ports between which signals carrying network traffic can flow. Such a hardware TAP splits the signals flowing between the network ports in order to provide duplicate signals via at least one monitoring port of the hardware TAP. In this case, the extracted network traffic data is a full duplication of the network traffic flowing through the TAP. Alternatively, the same or similar functions to monitor network traffic flowing between network ports can be implemented in software. A TAP sometimes refers to a passive component, whereas a mirror is active and involves a switch or router to copy data from one port to another. Although the following description refers to a TAP by way of example, the description applies equally to any other form of network monitoring component (including mirrors etc.).

FIG. 7 depicts a TAP 702 which could for example be installed within a corporate enterprise or otherwise private network, such as the private network 300 in FIG. 3, as part of the network infrastructure 302 thereof. Although only a single TAP 702 is depicted, multiple such TAPs could be deployed in this implementation across one or multiple private/closed networks. Tapped network traffic (that is, network traffic data extracted by the TAP 702 for the purpose of monitoring) is provided to a network appliance 704 (appliance sensor) for processing.

The appliance 704 operates in a similar manner to the endpoint agent 616, insofar as it processes the tapped network data in order to extract the same level of network traffic metadata. However, whereas the EPNS 616 summarizes traffic local to the endpoint 312, the appliance 704 summarizes the network traffic flowing through the TAP 702. The TAP 702 and appliance 704 constitute a network monitoring system 700. Although, in this instance, the TAP 702 and appliance 704 are shown as separate components, the core functionality of the network monitoring system 700—the ability to receive network traffic and extract network traffic metadata therefrom, whilst still allowing the network traffic to pass transparently through the system 700—may be provided by any component or components that is/are implemented using any combination of hardware and/or software.

FIG. 7 shows first and endpoint devices 312*a* 312*b*, which execute first and second instances 616*a*, 616*b* of the EPNS 616 respectively. In the present example, both EPNS instances 616*a*, 616*b* provide endpoint records summarising both incoming and outgoing network traffic at their respective endpoints 312*a*, 312*b*, with associated local endpoint data. In addition, as described above, the appliance 704 provides equivalent network traffic records for network traffic flowing through the TAP 702.

Referring to FIG. 3, the network TAP 702 could, for example, be located to monitor all network traffic flowing between the private network 300 and the Internet 306 in both directions.

FIG. 7 shows the second endpoint device 312*b* connected to transmit and receive network traffic via the TAP 702. For example, it could be the case that the second endpoint device 312*b* is connected to a local network in which the TAP is installed, such as the private network 300.

By contrast, the first endpoint device 312*a* can send and receive network traffic that does not necessarily pass through the TAP 702. For example, the first endpoint 312*a* may be connected to an open network such as the Internet. Note, this does not exclude the possibility of any network packets sent or received at or from the first endpoint 312*a* passing through the TAP; for example network packets exchange between the first endpoint device 312*a* and the second endpoint device 312*b* will flow through the TAP 702 (e.g. from the Internet 306 into the private network 300) because of the arrangement in which the second endpoint device 312*b* is connected. However, there may be other network packets sent/received to/from the first endpoint device 312*a* that do not flow through the TAP 702.

It is also noted that, whilst FIG. 3 shown the first endpoint device 312*a* connected to the private network 300, FIG. 7 assumes that it is not currently connected to the private network 300; a real-world example might be a laptop that is sometimes connected to the private network 300, but sometimes taken outside of it e.g. for remote working purposes.

The appliance 704 may also be referred to as a network sensor (APNS). In the following description, the abbreviations "EP" and "AP" may be used to denote the endpoint agent 616 and the appliance 704 respectively.

As indicated above, in broad terms, there are two duplication scenarios that can occur with multiple network sensors. The first is a situation in which two endpoint devices are running respective instances of the EPNS 616, each of which summarizes both incoming and outgoing network traffic. When two such endpoint devices are in communication with each other, outgoing packets sent from one of the devices to the other will be summarised as outgoing network traffic by that device, and incoming network traffic at the endpoint device receiving them. This leads to duplicate records generated by the endpoint sensors. This could, for example, occur in FIG. 7 if the first endpoint 312*a* and the second endpoint 312*b* are in communication with each other. Duplication arising in those circumstances may be referred to herein as EP-EP duplication.

The other form of duplication is referred to herein as EP-AP duplication. This is a situation in which duplicate records are provided by an endpoint sensor and an appliance sensor. In FIG. 7, this would apply to the second endpoint 312*b*. Endpoint records summarising incoming and outgoing network traffic generated by the second EPNS instance 616*b* might be duplicated as corresponding network traffic records generated by the appliance 704 because that network traffic is also flowing through the TAP 702.

Techniques are described below for addressing both duplication scenarios.

For EP-EP duplication, the described techniques do not attempt to prevent the different endpoint agent instances 616a, 616b from performing duplicate processing and submitting duplicate metadata. All such endpoint agents continue to process and fully summarise their incoming and outgoing network traffic. All of those records will be sent to the endpoint server 620 (not depicted in FIG. 7 but shown in FIGS. 6 and 8) where deduplication will be performed centrally. As noted above, in addition to collecting and summarising local network traffic information, each endpoint agent instance 616a, 616b additionally collects associated endpoint data based on local endpoint monitoring. Although the network traffic information may be duplicate between two endpoint agents in the circumstances outlined above, the associated endpoint data will be different. An aim of the EP-EP deduplication process described below is to remove duplicate network traffic data whilst retaining the unique endpoint data collected by both endpoints.

EP-AP deduplication is performed, in the following examples, at the network monitoring system 704. In this case, the aim is to prevent the appliance from submitting duplicate network traffic records when it can determine that the information is already being provided by an EPNS instance. This detection is performed based on "TAP discovery messages" transmitted by endpoint agents to allow them to be discovered by the network monitoring system 6700 in this manner. When the network monitoring system 700 receives a TAP discovery message, signalling that an endpoint agent is running on a particular endpoint device, such as the second endpoint device 312b, it will not provide duplicate network traffic records of any network traffic sent/received to/from that endpoint device 312b that is flowing through the network TAP 702.

To facilitate EP-AP deduplication, every endpoint agent instance 616a, 616b regularly transmits TAP discovery messages. In the following examples each TAP discovery message takes the form of an DNS (domain name system) query for a recognisable DNS name. Each TAP discovery message is submitted to a TAP discovery service 706. The conventional purpose of a DNS message is to resolve a domain name to an IP address. However, that is not the purpose of the TAP discovery messages. Rather, the ability of DNS queries to provide one-way communication from an endpoint to a service is exploited. The DNS queries are not resolved to an IP address, and do not actually relate to a domain in the conventional sense. Rather, a domain name field of each DNS request (specifically, the query name field) is used to carry an encrypted message that signals the existence of the endpoint agent and the fact that it is currently operating to provide network traffic summary records.

Each TAP discovery message either crosses a TAP monitored by the cybersecurity platform (such as the TAP 702), in which case the endpoint is said to be a non-roaming endpoint, or does not cross any such TAP, in which case the endpoint is said to be roaming. In FIG. 7, it can be seen in TAP discovery messages sent from the endpoint agent 616b on the second endpoint device 312b do cross the TAP 702 and are therefore received by the appliance 704, thereby alerting the appliance 704 to the existence of the second endpoint agent instance 616b. The second endpoint 312b is non-roaming under the above definition.

By contrast, TAP discovery messages sent from the first endpoint device 312a do not cross the TAP 702 nor, in this example, do they cross any other TAP monitored by the cybersecurity platform. The first endpoint device 312a is therefore said to be roaming.

When a TAP discovery message is detected by the network monitoring system 700, a list of non-roaming devices is updated. Traffic associated with any non-roaming devices in this list will be discarded by the network monitoring system 700.

In addition, VLAN (virtual local area network) and MPLS (Multiprotocol label switching) label information is added to a message queue so that the endpoint server 620 can correctly enrich outputs with these labels. Each endpoint is uniquely identified by a universal identifier (UID) and the precise endpoint UID and source IP address identify the label associations.

Note that what is germane in this context is whether or not TAP discovery messages are received by the appliance sensor 704. Such messages are received as part of the tapped network traffic from the network TAP 702. The purpose is to alert the appliance 704 to non-roaming devices that are performing local network monitoring and providing summary records to the endpoint server 620. The TAP discovery service 706 itself is a "dummy service" that receives TAP discovery messages from both roaming and non-roaming devices.

The format and contents of a TAP discovery message is shown in FIG. 7, denoted by reference numeral 710. A domain name field of the TAP discovery message (DNS query) contains an endpoint descriptor blob and a cache buster string.

To ensure security of the TAP discovery messages, the endpoint descriptor blob is a hex string encoded byte array which identifies the endpoint device generating the TAP discovery message. It contains the globally-unique identifier (UID) assigned to the endpoint device by the endpoint agent. Among other things, the network monitoring system 700 uses the UID in a TAP discovery message to attach label information to the UID, and reports such label information to the endpoint server 620 in a label association record (as described below in relation to FIG. 11).

Endpoints also include their UIDs in telemetry records they submit (including "flow start" records) to facilitate EP-EP deduplication.

Several security requirements are imposed on the endpoint descriptor blob:

1. Resistance to eavesdropping: an attacker inside or outside the customer network may be able to eavesdrop on the TAP discovery message. This is particularly true given that the TAP discovery message is sent periodically regardless of network (i.e. also on untrusted networks). Details carried by the message must not be visible in plaintext.

2. Resistance to replay: is an attacker were able to replay an eavesdropped message, they could fool the appliance software into discarding TAP traffic from an IP address which is no longer assigned to a device with the endpoint agent installed (assuming an address assignment change since the original message that was replayed, e.g. after a DHCP lease expires). It must be infeasible to replay messages to this effect.

3. Resistance to tampering: an attacker inside or outside the customer network may be able to tamper with the TAP discovery message. If successful, the attacker could create fake messages that fool the appliance software into discarding TAP traffic, or modify real messages to change the associated precise endpoint device ID. It must be infeasible to tamper with a TAP discovery message to this effect.

The requirements above are met as follows:

1. Eavesdropping protection: an AES cipher in CBC mode and initialised with a random initialisation vector (IV) is used to encrypt the message contents with a pre-shared key.

2. Replay protection: each message is timestamped. The software of the appliance 704 will ignore messages whose timestamp is greater or less than the appliance clock by a configured tolerance.

3. Tampering protection: a message authentication code (MAC) is included in the endpoint descriptor blob. It is calculated from the encrypted descriptor blob. If the MAC as calculated by the appliance software is different to that included in the blob, the message is ignored. SipHash is the MAC algorithm. It uses a pre-shared key that is different to that used with the AES cipher.

Figure 8:
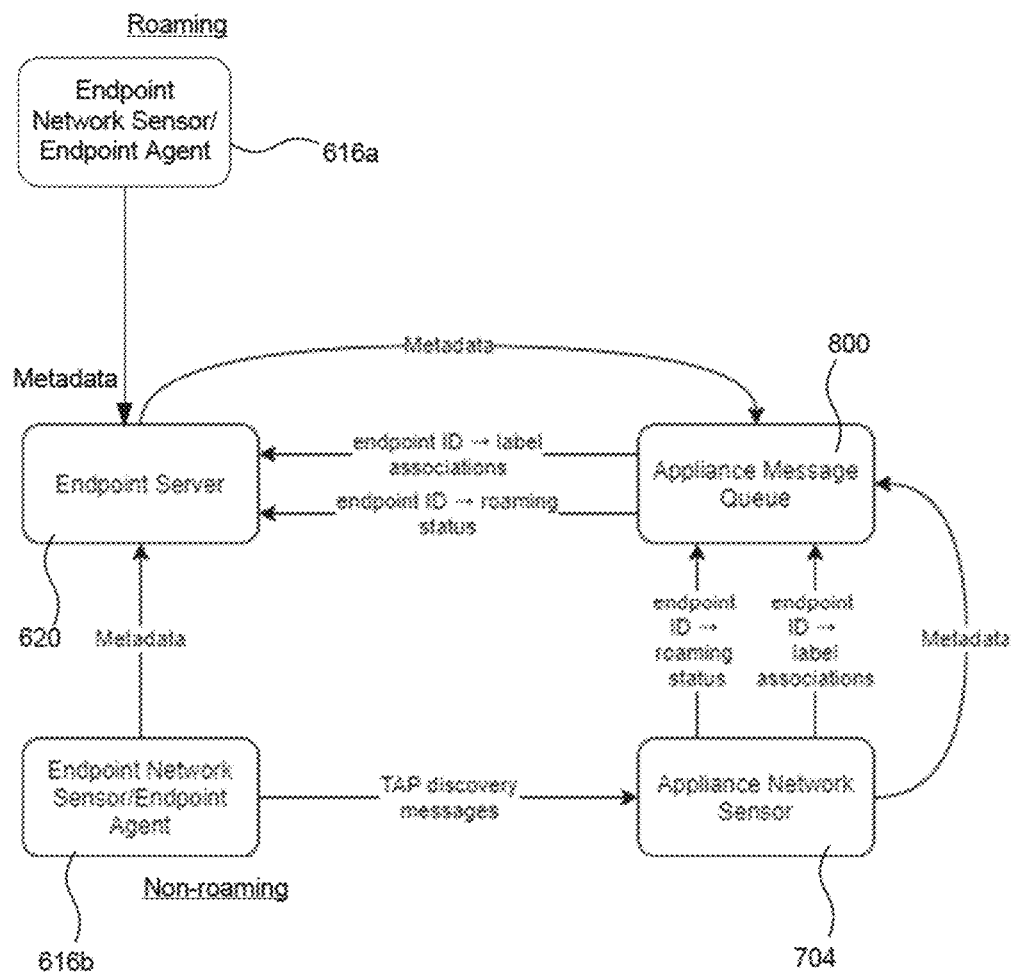
FIG. 8 shows inter-component flows for roaming and non-roaming endpoints.

FIG. 8 shows an example of inter-component flows between the second, non-roaming endpoint agent instance 616*b*, the appliance senor 704 and the endpoint server 620. The second endpoint agent instance 616*b* submits its collected network traffic metadata in a series of endpoint records to the endpoint server 620. TAP discovery messages broadcast by it reach the appliance network sensor 704 in the manner described above with reference to FIG. 7. An appliance message queue 800 is provided for the purpose of storing network traffic metadata to facilitate the cybersecurity analysis, and related functions such as enrichment, augmentation and/or linking. In the context of the system of FIG. 1, the application message queue 800 corresponds to the observation delay line 116, where enriched records are stored for the purpose of reasoning and case creation.

Metadata received from endpoints at the endpoint server 620 is stored in the appliance message queue 800 along with metadata collected by the appliance sensor 704. As described above, the appliance network sensor 704 also provides identifiers of endpoints and their roaming status together with label associations for the purpose of enrichment.

FIG. 8 additionally shows the first, roaming instance of the EPNS 616*a*, which submits metadata to the endpoint server 620, which in turn is placed in the appliance message queue 800 in the same way. TAP discovery messages broadcast by the first instance of the EPNS do not reach the appliance network sensor 704 for the reasons discussed above.

Figure 9:
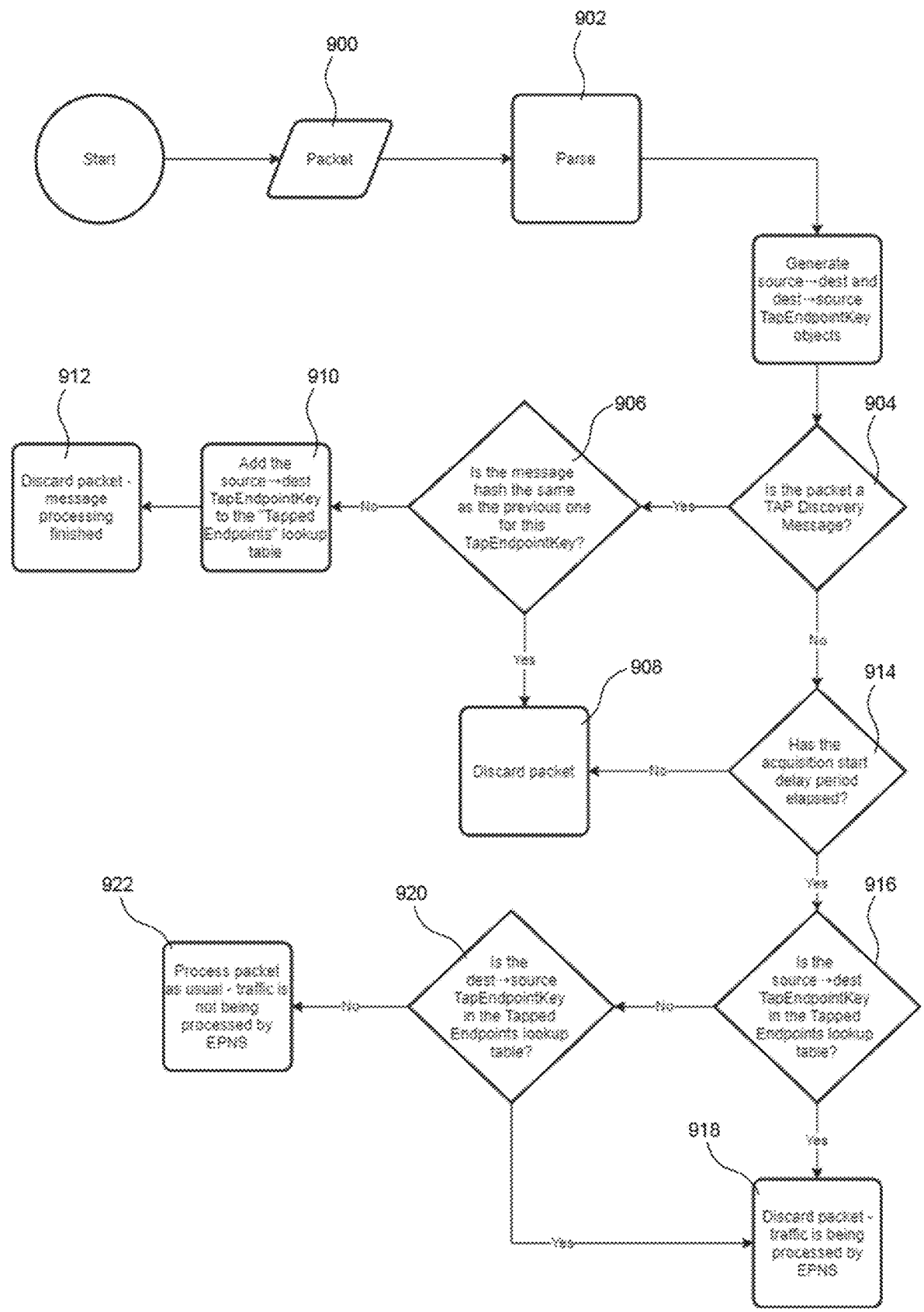
FIG. 9 shows a flow chart for a method of endpoint-appliance deduplication.

Endpoint-appliance (EP-AP) deduplication:

FIG. 9 shows a flow chart for an EP-AP deduplication process that is performed at the appliance sensor 704. In this example, the appliance sensor 704 receives a full copy of all network traffic flowing through the TAP 702 in both directions. The method of FIG. 9 is performed to determine whether or not to extract metadata from them that is then submitted to the endpoint server 620, or simply discard tapped packets because the appliance has determined that an endpoint agent is going to provide the necessary metadata to the endpoint server 620. This prevents unnecessary processing of packets because metadata is only extracted to the extent deemed necessary to provide full network monitoring information across endpoints collectively whilst avoiding unnecessary duplication. That has benefits in terms of reduced processing and storage requirements. Nevertheless, the underlying techniques for identifying duplicate traffic can be employed in other contexts as well. For example, the techniques could alternatively be applied to after metadata has been extracted in order to filter out duplicate metadata before the remaining metadata is submitted to the endpoint server 620. The term "filtering out" is used generally to refer to the fact that certain metadata is not provided to the endpoint server 620. In the following examples, that is ensured by filtering the raw tapped network packets to prevent such metadata being extracted from them in the first place. However, in other implementations, it could be implemented by selectively removing parts of metadata after it has been extracted.

In FIG. 9, a packet 900 is received and passed at step 902 to generate first and second TAP endpoint key objects. The first TAP endpoint key is created for the source IP address and the second TAP endpoint key (the "reverse" key) is created for the destination IP address. The contents of a TAP endpoint key are depicted schematically in FIG. 13, indicated by reference numeral 1304 (described below). In brief, a TAP endpoint key is an endpoint IP address, together with any available label information (see below). Both keys are created to maximize de-duplication—for a packet passing through the TAP 702, either one of the source and destination endpoints might be reporting that traffic.

At step 904, a determination is made as to whether a packet contains a TAP discovery message. If so, then, at step 906, a determination is made as to whether a hash of the message is the same as a previous message for the source TAP endpoint key.

If so, that implies a TAP discovery message has already been received from that endpoint and recorded (i.e. the network monitoring system 700 is already aware of the existence of the endpoint agent on that endpoint, and should already be taking steps to avoid deduplication); hence, the packet is discarded at step 908. If not, that implies this is the first TAP discovery message received from that endpoint, i.e. this is the first time the network monitoring system 700 has become aware of the endpoint agent on that endpoint. Hence, the source-destination TAP endpoint key is added to a TAP endpoint—look up Table at step 910 and the processing finishes at that point with the packet being discarded at step 912.

Returning to step 904, if the packet is not a TAP discovery message, then, at step 914, a determination is made as to whether an acquisition start delay period has elapsed. Step 914 accommodates the period when the appliance 704 first becomes active. For an initial period following activation, the appliance 704 will not have had an opportunity to receive TAP discovery messages from all active endpoint agents; step 914 prevents the appliance 704 from providing duplicate telemetry records prior to receiving the first TAP discovery message from the endpoint in question. The delay period is configurable. Generally speaking, if endpoint agents send TAP discovery messages every t seconds, a delay of around 2 t second is sufficient.

If the period is not elapsed then the method proceeds to step 908 where the packet is similarly discarded with no further processing (the priority here is avoiding duplication—at this point in time, the appliance 704 cannot be sure if an endpoint is reporting the packet, so it ignores it). If the acquisition start delay period has elapsed, then at step 916 a determination is made as to whether the source-destination TAP endpoint key is in the tapped endpoints look up table. If so, then it can be assumed that the discarded packet is being processed by an EPNS and it is therefore discarded at step 918. If not, then at step 920, a determination is made as to whether the destination-source TAP endpoint key is in the tapped endpoint look up table. If so, then the method similarly proceeds to step 918 because it can be assumed that the packet is being processed by an EPNS. If neither the source-destination TAP endpoint key nor the destination-source TAP endpoint key is present in the tapped endpoint look up table the packet is processed as usual by the appliance 704, because it cannot assumed that any EPNS is processing and reporting that packet (step 922).

Endpoint-Endpoint (EP-EP) deduplication

All network traffic metadata records are associated with an endpoint deduplication flow key (EpDedupeFlowKey or EDFK). An EDFK is presented as a byte array to the endpoint server 620 and is used as a key that maps to a precise endpoint ID (UID or unique identifier). The EDFK is specific to the flow (not either endpoint), but the endpoint UID is used for the purpose of record deduplication.

When a record is received, a mapping is queried for the presence of a corresponding EDFK. If one exists for a different precise endpoint ID, it means a network traffic is already being reported by another device and the received record should be discarded (but not the endpoint data associated with it to the extent that applies. That is to say, process, host and user details should be preserved for use later in enrichment of output records.

If such a record, on the other hand, does not exist or exists for the same endpoint ID that sent the record, it means this device is reporting this flow. In that event, an entry in a mapping table is created (if it doesn't exist already) for the key and all future associated records for this precise endpoint ID are stored.

Figure 10:
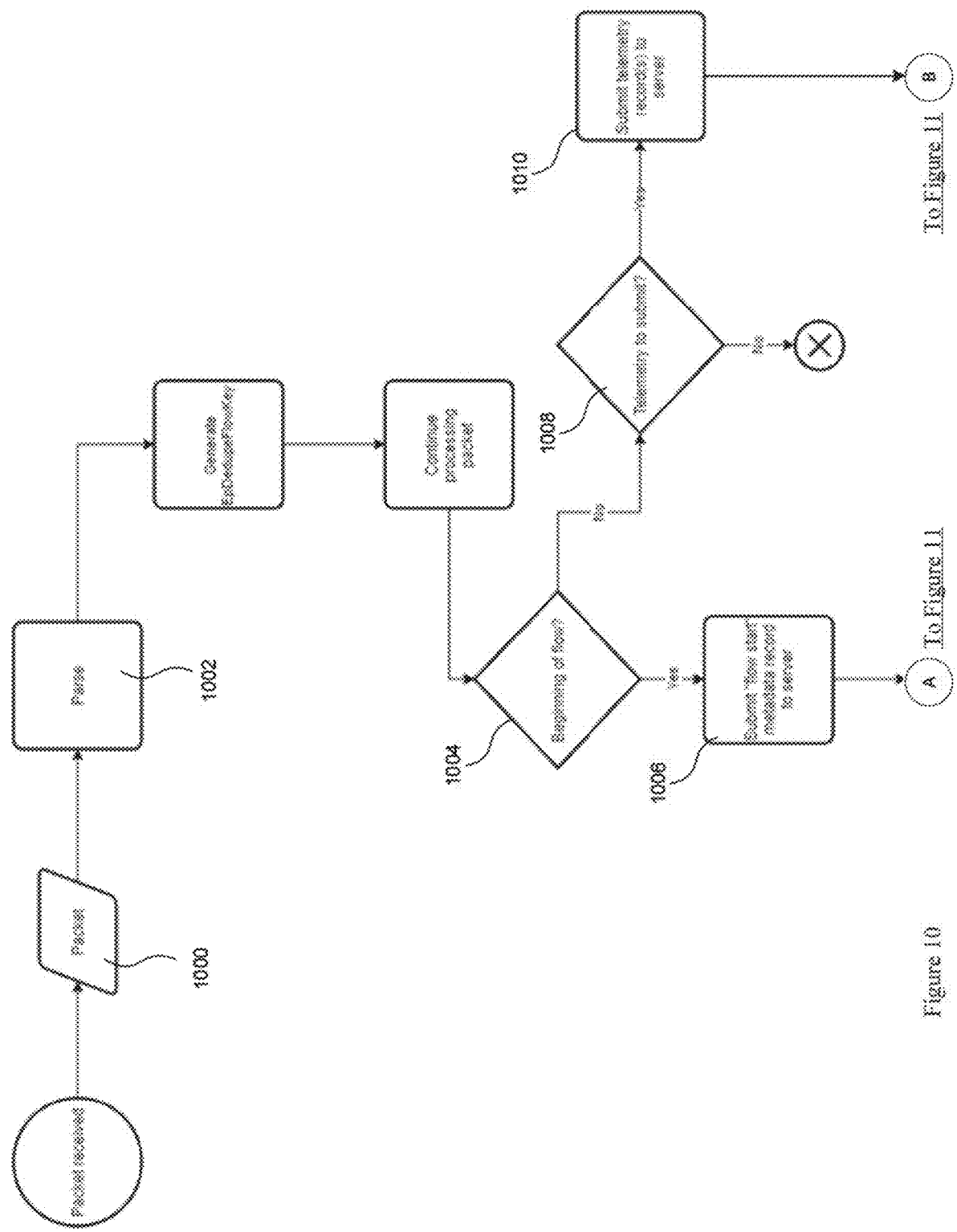
FIG. 10 shows a flow chart for a method of generating network telemetry records at an endpoint device.

FIG. 10 shows certain steps involved in the extraction of metadata at an endpoint device 312.

When an endpoint record is deduplicated with another endpoint record, there are two sets of process/user details which could be recorded against the record: the sender's and the receiver's. In order to make use of both of these sets, the endpoint data (e.g. process/user details) associated with flows (uniquely identified by an EpDedupeFlowKey) from both devices' perspectives are submitted to Endpoint Server. Both endpoints generate the same EpDedupeFlowKey for the same flow. The endpoint server 620 only ever accepts metadata records (also referred to as network telemetry records) from one of the communicating endpoint devices. The other device (the one it does not accept records from) is termed the "peer" endpoint. The peer endpoint process/user fields are stored against the flow so that all network telemetry records associated with that flow can be enriched with these details when they are submitted. In addition, the server provides any VLAN/MPLS labels associated with IP pairs observed during TAP discovery for enrichment.

A packet 1000 is received via the local traffic access function 612, which is a copy of an incoming or outgoing packet received at or sent from the endpoint device 312. The packet is passed at step 1002 in order to generate an EDFK for the packet 1000.

At step 1004, a determination is made as to whether the packet 1000 constitutes the start of a network flow. A network flow is uniquely identified by an EpDedupeFlowKey, whose elements are described below with reference to FIG. 13.

If so, then a special "flow start" metadata (telemetry) record is submitted to the endpoint server for the packet 1000 at step 1006. Otherwise, a determination is made as to whether there is any new metadata (telemetry) to be submitted at step 1008. The frequency at which new telemetry records are generated depends on the implementation, and a record may pertain to more than one packet. If there is no metadata to submit in respect of the packet 1000, the process ends. However, if there is metadata to be submitted, that is submitted to the server in one or more metadata records at step 1010.

Figure 11:
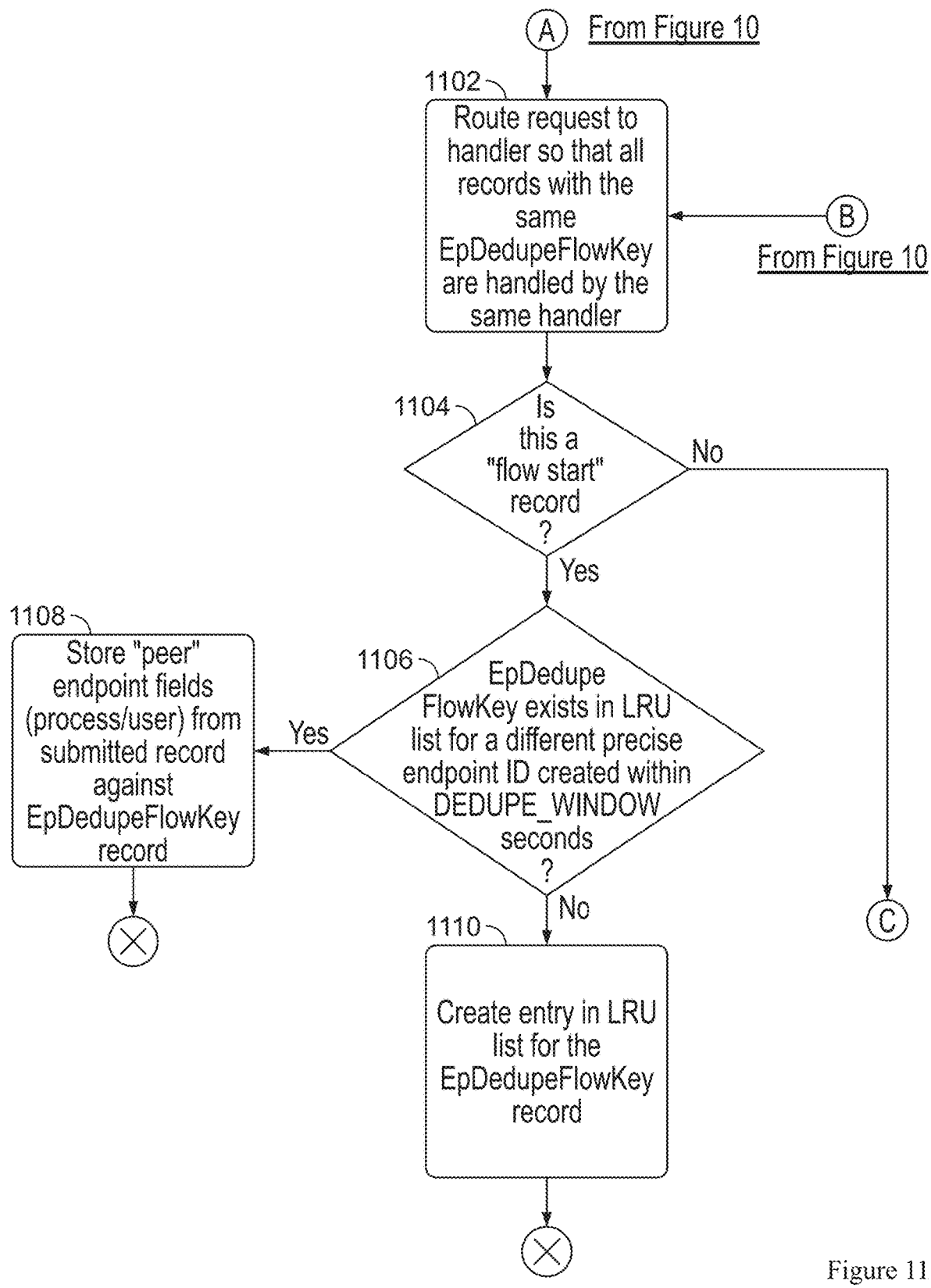
FIG. 11 shows a flowchart for a method of endpoint-endpoint deduplication.
Figure 11:
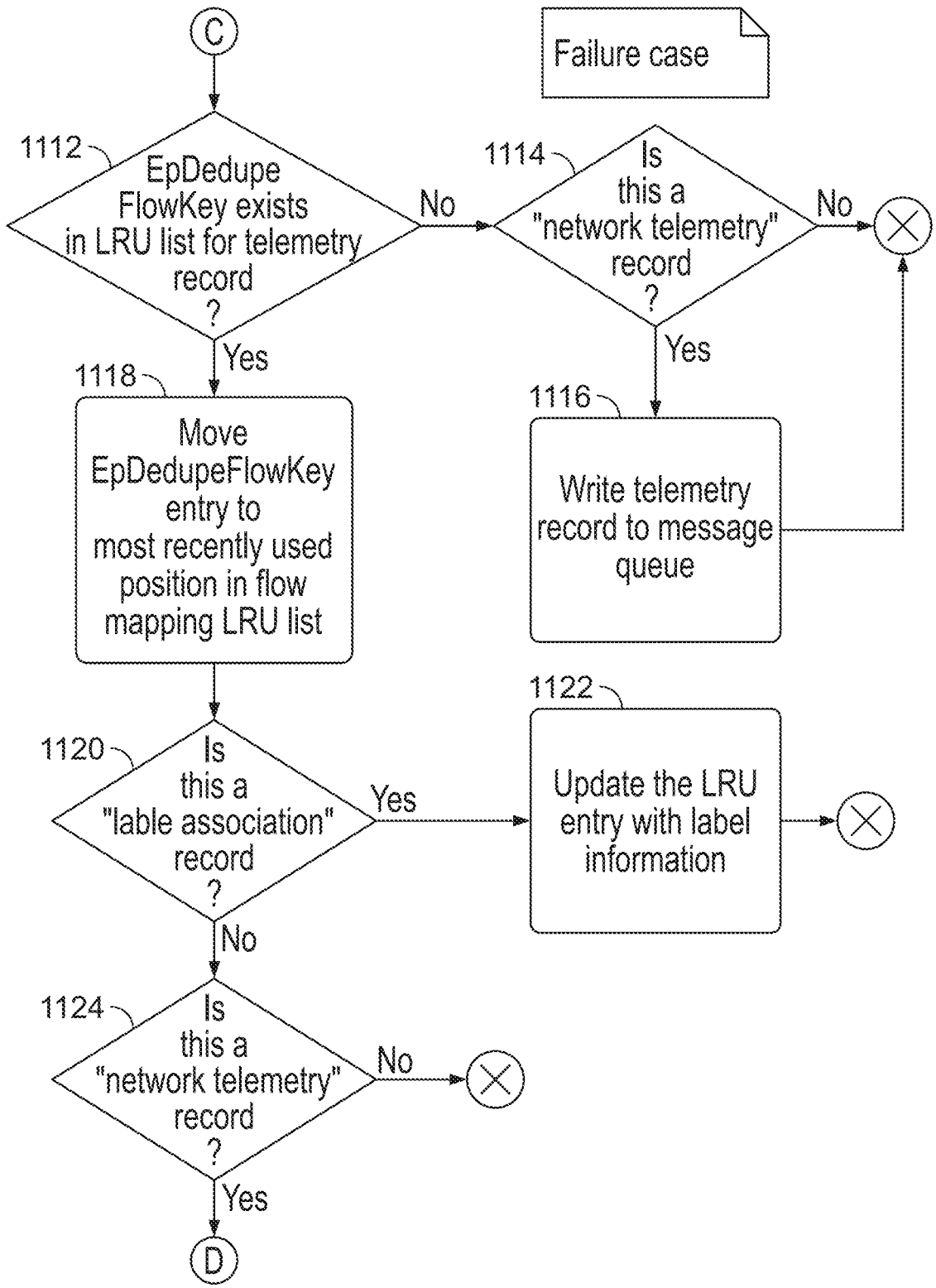
Figure 11:
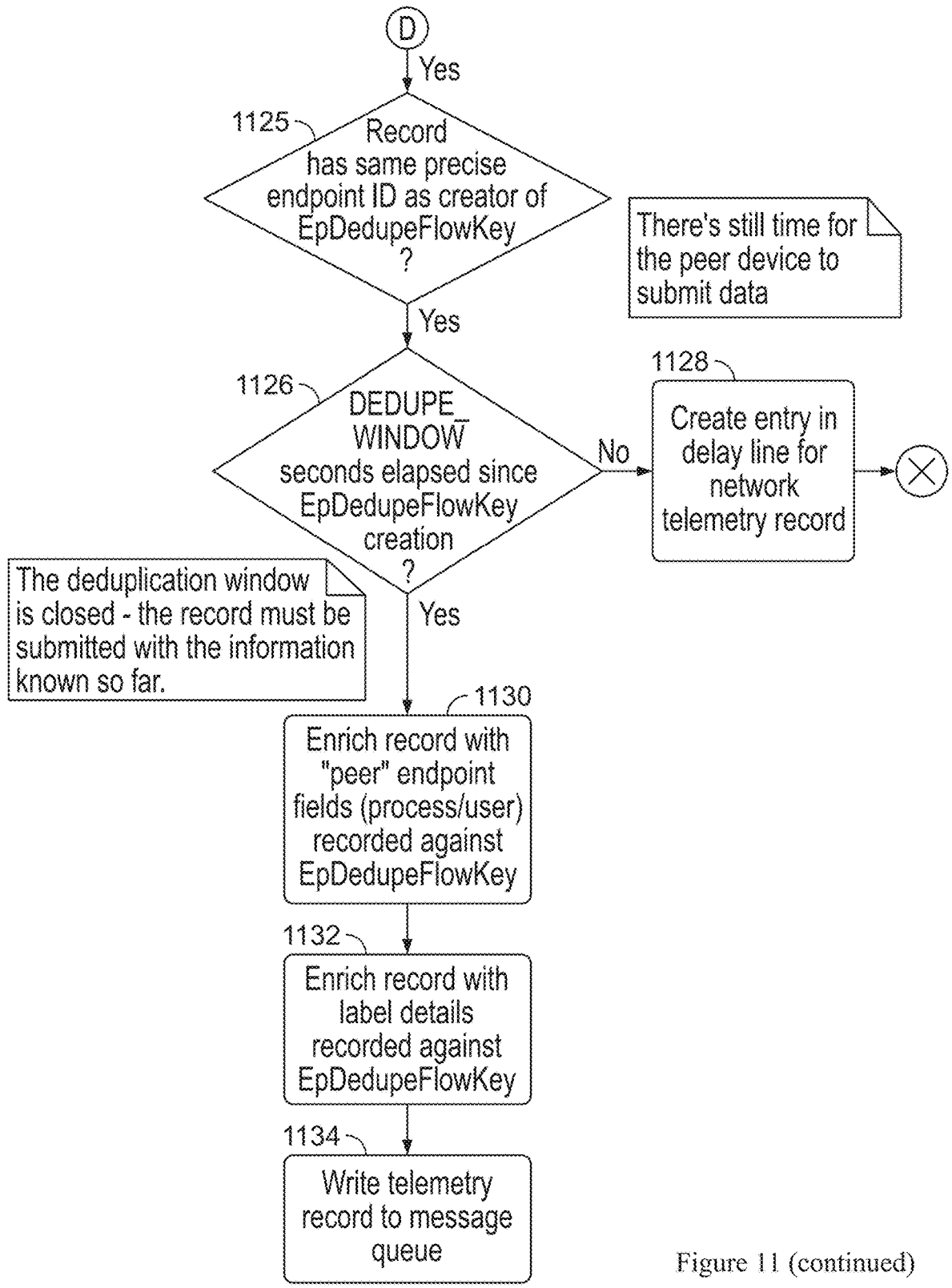

FIG. 11 shows a method of EP-EP deduplication performed at the endpoint server 620 when receiving records from multiple sources, that could include multiple EPNS instances. The method of FIG. 11 distinguishes between flow start records indicating a new flow (step 1106 of FIG. 11) and other subsequent network telemetry records that pertain to an existing flow (step 1010 of FIG. 11). The method also considers "label association" records whose purpose is described later.

Some endpoint records will need to be enriched with additional data before being added to the message queue 800. In the present examples, such data is serialised prior to submission, using a serialization protocol such as protobuf (Protocol Buffers). Therefore, the endpoint server 620 has the ability to deserialize the serialized (e.g. protobuf data) it receives from endpoint agents.

Enrichment logic can vary depending on the type of the record. The record type is therefore indicated external to the protobuf record, so that deserialization can be avoided if enrichment is not required, or the record can be routed to the correct enrichment logic using the type. Note that this type is equivalent to the message queue topic, which is the fully-qualified protobuf schema name.

To maximise parallelism records are distributed to multi-threaded handlers at the endpoint server 620 so that state is not shared across threads (e.g. by flow key % thread count for EPNS records).

The purpose of the method of FIG. 11 is to identify records received from different EPNS agents that are duplicate in the sense that they contain duplicate network traffic information (although, as noted, they may be associated with different endpoint data gathered from local monitoring at their respective endpoint devices). At step 1102, an incoming metadata record is routed to a specific one of the handlers based on its EDFK. As indicated in FIG. 11, this incoming record, in the case of any EPNS instance, could be a flow start metadata record as generated at step 1106 FIG. 10 or a normal metadata record generated at step 1010. Step 1102 ensures that all records with the same EDFK are handled by the same handler.

The subsequent steps of FIG. 11 are implemented in parallel by each thread, in respect of each record allocated to that thread.

At step 1104, a determination is made as to whether the metadata record is a flow start metadata record. If so, then, at step 1106, a determination is made as to whether an EDFK already exists in a flow mapping cache for a different precise endpoint ID created within some specific recent time interval (deduplication window or DEDUPE WINDOW), such as the last T seconds.

The flow mapping cache is implemented as an LRU (Least Recently Used) list. The LRU list is a convenient data structure for managing "stale" state. When an entry is used—where "used" in this context means created or created—it is moved to a most-recently used position in the list, meaning that entries are ordered according to how recently they have been used. Stale entries, which have not been used for some time, may be expired by truncating the LRU list by an appropriate amount, to remove a number of the least recently used entries.

The EDFK may already exist but with a different endpoint ID in the event that that other endpoint is also reporting the same network traffic. This could occur in a situation when two endpoints executing endpoint agents are communicating with each other and both submitting records of the network traffic exchange between those endpoints. In this case, both endpoints will submit flow start records, and one of those records is processed first at the server 620. The endpoint whose flow start record is processed first is termed the "winner" (or winning endpoint), with the other endpoint termed the peer (or peer endpoint).

The EDFK is generated by each endpoint in a manner that is unique to that pair of endpoints but in a way that ensures the two endpoints generate the same EDFK, as described below with reference to FIG. 13. If the EDFK already exists but is mapped to a different endpoint UID, that implies that other endpoint is the winner, having already submitted a special flow start metadata record for the flow in question. In those circumstances, this, in turn, implies that the record being processed is duplicate, because it is informing the server 620 of a flow that it has already been made aware of. In that event, the flow start record from the peer endpoint may nevertheless have unique endpoint data associated with it for the reasons discussed, therefore at step 1108, the associated endpoint data is extracted or otherwise obtained and stored against the EDFK. Storing that endpoint data in association with the EDFK allows it to be matched subsequently to the records sent by the other endpoint in respect of the same network flow. In other implementations, flow start records may be sent without associated endpoint data, in which case the aforementioned operations may be omitted. In such cases, endpoint data that has been associated with a flow locally at the endpoint 312 is instead reported in subsequent record(s), and stored server-side against the EDFK later in the process when those subsequent record(s) are processed. Whether or not endpoint data (e.g. process/user details) are received with a duplicate flow start record, at step 1108, the peer's UID reported in the flow start record may be added to existing EpDedupeFlowKey LRU entry (to map the existing EDFK to the peer's UID). Hence, step 1108 may, depending on the implementation, comprise both the extraction and storing of endpoint data from the flow start record and the mapping of the peer UID to the existing EDFK entry, or only the latter in the case that the flow start records does contain endpoint data.

On the other hand if, at step 1106, the EDFK does not already exist in the flow map and cache for a different endpoint within the applicable time interval, that implies this is the first time the network flow in question has been reported—the endpoint from which it has been received is therefore the winner in this scenario. Therefore, at step 1110, an entry is created in the flow mapping cache containing the EDFK and the unique endpoint identifier (UID) of the winning endpoint that has submitted the record currently being processed. After flow start records have been received and from both endpoints, the EDFK will be mapped server-side to the UID of both the peer and winning endpoint, by virtue of steps 1108 and 1110 respectively.

Considering the example of FIG. 7, suppose that both the first endpoint device 312a and the second endpoint 312b are submitting records of network traffic and that those endpoints are communicating with each other. When a new network flow is established between the first and second endpoints 312a and 312b, both of those endpoints will submit flow start metadata records to the endpoint server 620. Assuming, for the sake of illustration, that the flow start metadata record sent from the first endpoint device 312a is processed first at the endpoint server 620, then the first endpoint 312a is the winner; the method of FIG. 11 will proceed eventually to step 1110, which will result in the EDFK for that record being cached against the unique endpoint identifier of the first endpoint 312a. When the flow start metadata record from the second endpoint 312b (the peer in this scenario) is subsequently processed, the method of FIG. 11 will proceed in respect of that record, to step 1108, because the earlier entry containing the same EDFK and the unique identifier of the first endpoint 312a will be found at step 1106 in respect of that record. Any endpoint data associated with the flow start record from the second endpoint 312b will be retained at step 1108 so that it can be subsequently matched with telemetry records sent from the first endpoint 312a.

Returning to step 1104 of FIG. 11, the second branch considers the case when a received record is not a flow start metadata record. In that event, the method proceeds instead to step 1112, at which it is determined whether the EDFK exists in the flow mapping cache. At this point in time, the EDFK should exist—because under normal circumstances, a flow start record should have been received from at least one (and possibly two) communicating endpoints. The "no" branch is therefore a failure case. In this case, assuming the record in question is a valid network telemetry record (1114), the record is written to the message queue 800 at step 1116, from which it can be retrieved and used in subsequent cyber security analysis. Generally speaking, it can be assumed that the network is reliable and that sent messages will be received in the order they are sent. As will be appreciated, some additional tolerance could be added to accommodate the case where the subsequent flow start message arrives after the preceding flow stat message (such as a brief delay to give the flow start record time to arrive in that event).

More typically, the EDFK will exist at step 1112. In that case, at step 1118, the entry containing the EDFK is moved to the recently used position in the LRU list, to identify it as the most recently used entry in the list.

Steps 1120 and 1122 pertain to label association records briefly mentioned above. Label association records address the following scenario. Certain information about the endpoints may not be visible to the endpoints themselves. This includes, for example, VLAN and/or MPLS tags (labels) that might be attached to packets within the network to facilitate certain functions within the network, but which may not be visible to endpoints sending or receiving those packets. MPLS labels facilitate more efficient MPLS routing within a portion of the network, whilst VLAN tags help to identify packets travelling via trunk links. Such labels can be a useful source of information for uniquely identifying network flows, but may only be attached to network packets temporarily. Network components with visibility of such labels can, however, report those labels to the endpoint server 620. For example, the appliance sensor 704 may have visibility of such tags in packets it received from the TAP 702. As described above, the network monitoring system 700 will generally filter-out packets when it knows those packets are being summarized by an endpoint agent. However, in the event that the appliance 704 is able to associate a particular tag or set of tags with a given endpoint ID (UID), it reports that association to the endpoint server 620 in a label association record.

Returning to step 1120 of FIG. 11, if the record in question is a label association record, then at step 1122, the LRU entry is updated with label information contained in the label association record. This facilitates subsequent enrichment of telemetry records received from the winning endpoint, in the same way as endpoint data received from the peer endpoint. Although not expressly depicted, the label information could be stored in a separate data structure with its own lifetime management from which it could be retrieved during enrichment of the telemetry records. This could accommodate a possible scenario in which the label data is received before the initial flow start record.

Otherwise, if (1124) the record in question is a valid network telemetry record received from the winning endpoint, the method proceeds to step 1126. Recall that the winning endpoint is the endpoint whose flow start record was processed first, and whose UID has been recorded against the EDFK at step 1110—only network telemetry records from the winning endpoint are retained to avoid duplication of records, but they are enriched with endpoint data reported by the peer endpoint as that is valuable information unique to the peer endpoint. This is accommodated at step 1125, where it is determined whether the network telemetry record has the same precise endpoint UID as the creator of the EDFK; the method only proceeds to step 1126 if that is the case. If not, the record is not processed further in this example (in this particular implementation, the endpoint metadata that is collected does not change over the course of the flow; it is therefore assumed that any peer endpoint data has already been extracted from the peer flow start record. In other implementations, in the event there is new peer endpoint data, this could be extracted and stored against the EDFK for subsequent enrichment in the same manner as step 1108).

Step 1126 imposes a delay before the record can be written to the message queue 800. Specifically, if less than DEDUPE WINDOW has passed since the EDFK entry was created in the LRU list. If not, an entry for the record is created (1128) in a delay line (e.g. the observation delay line 116 of FIG. 1, or another delay line), and the processing of the record is temporarily suspended (the method of FIG. 12 addresses this situation—see below). This delay is to allow sufficient time for the peer endpoint to submit its endpoint data, if it has not done so already. This also allows time for any label associations to be reported and processed. A delay of a few seconds is generally sufficient. All records could for which DEDUPE WINDOW has not expired may be delayed in this way or, alternatively, a check may be performed at step 1126 to see if the peer endpoint data (and, where applicable, label associations) have been received and stored against the EDFK, with the method only proceeding to step 1128 if the relevant data has not yet been received.

If, on the other hand, DEDUPE WINDOW has expired at step 1126, the deduplication window is said to be "closed", and the processing of the record continues, even if the peer endpoint data has not been received at that point (the length of DEDUPE WINDOW is chosen to ensure that this is a relatively rare occurrence—as noted, a length of a few seconds is generally sufficient). In that event, the processing of the record is completed by enriching it with any available peer endpoint data and label information stored against the EDFK (steps 1130 and 1132 respectively, before writing the enriched telemetry record to the message queue 800 at step 1134. Once written to the message queue 800, it becomes available for the purpose of cybersecurity analysis applied within the platform of FIG. 1.

Figure 14:
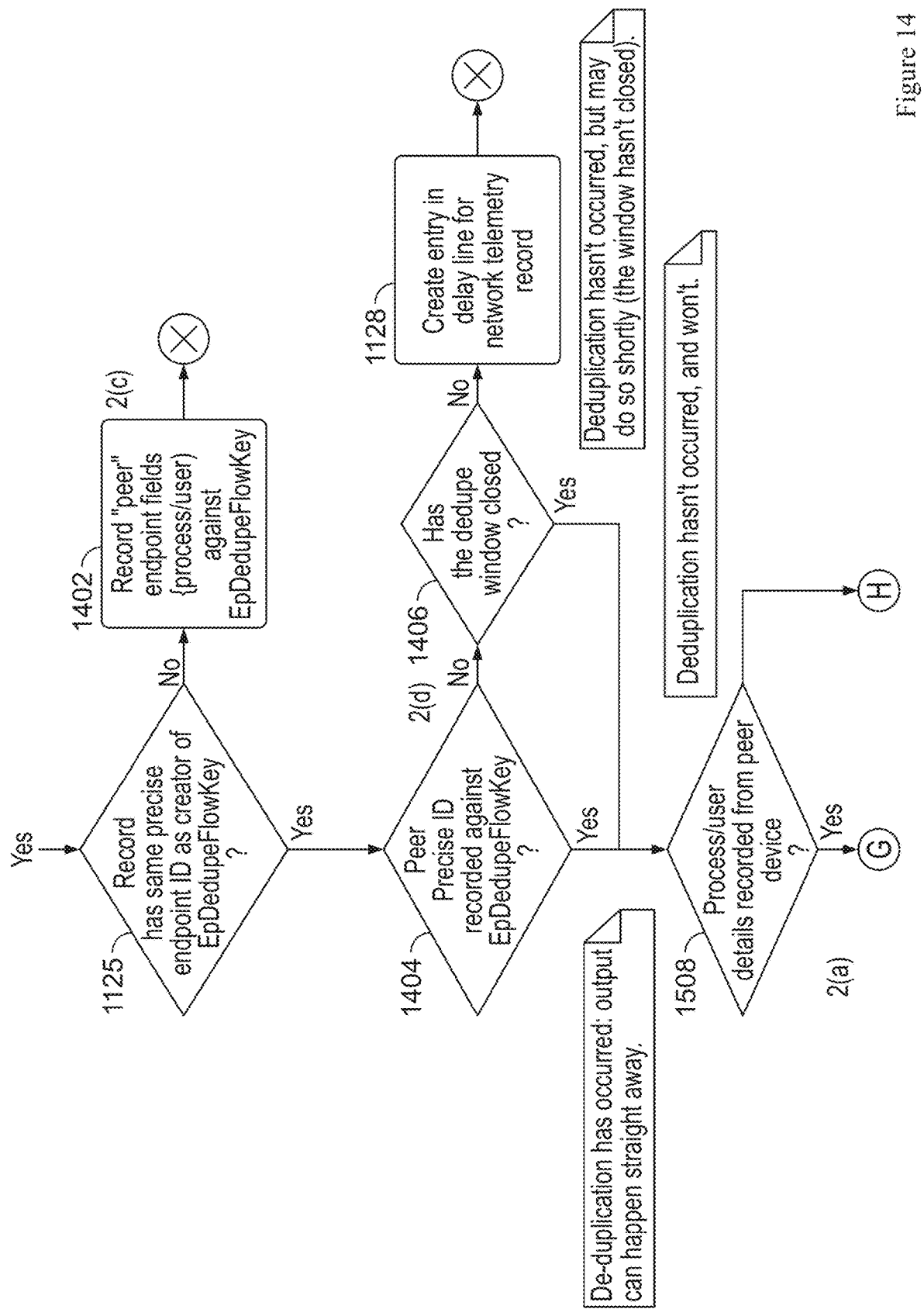
FIG. 14 shows a second method of endpoint-endpoint deduplication.
Figure 14:
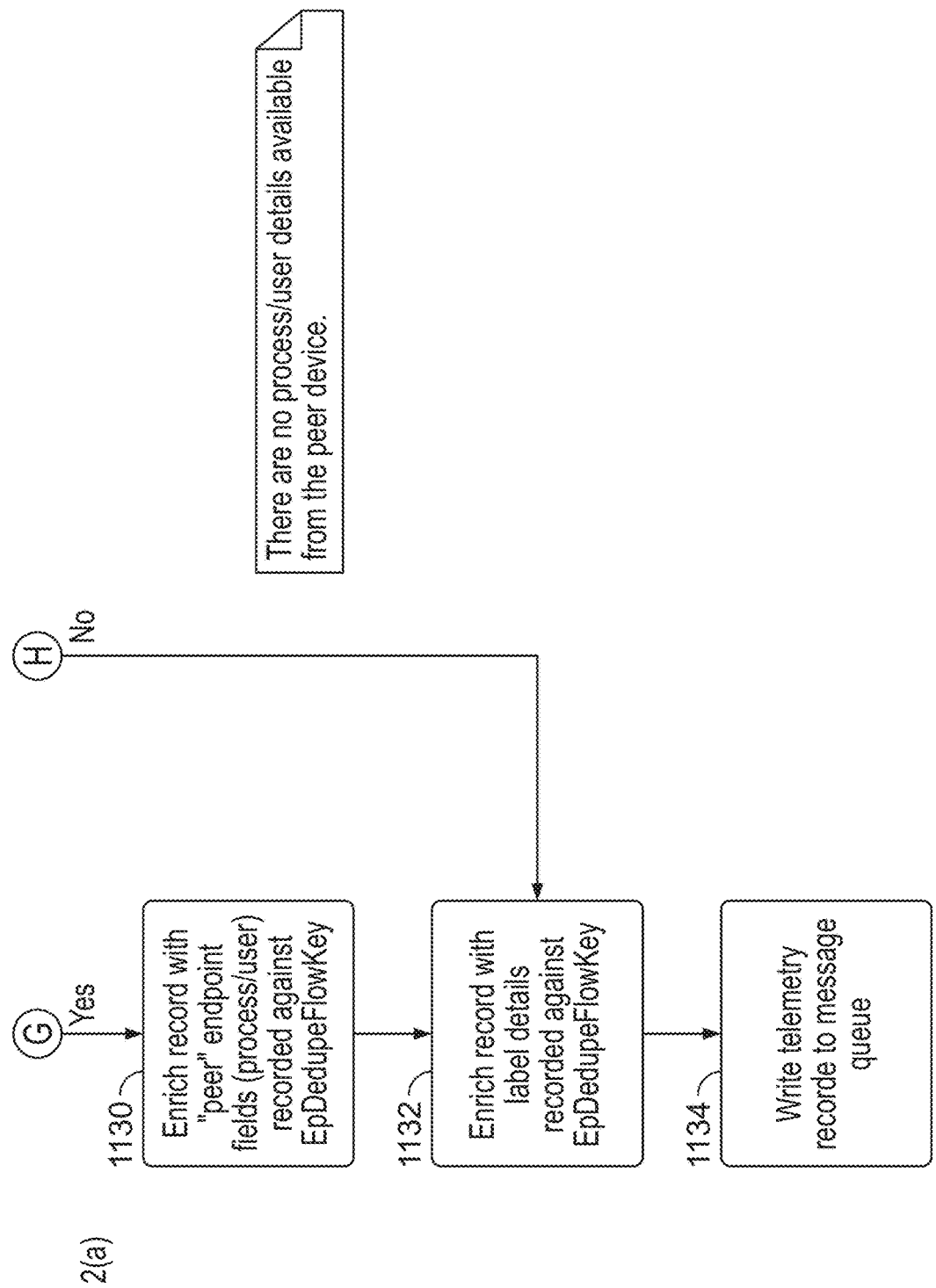

FIG. 14 shows a variation of the method of FIG. 11. Only a subset of steps is shown, because the method of FIG. 14 is otherwise the same as that of FIG. 11. Reference numerals 1125, 1130, 1132 and 1134 in FIG. 14 denote the equivalent steps of FIG. 11, and the description of those steps is not repeated. As noted above, in some implementations, new endpoint data may be received with non-flow start records in some implementations (including implementations where endpoint data is not sent with a flow start record and is only sent in subsequent record(s), and/or implementations in which the nature of the endpoint data that is collected can change over the course of a flow). This is accommodated by step 1402, performed in the event a non-flow start record is received from the peer endpoint, rather than the winning endpoint, and therefore does not have the same UID as the creator of the EDFK (the winning endpoint)—step 1125, no branch. At step 1402, any endpoint data (or any new endpoint data not already recorded) received in or with the non-flow start record (e.g. peer process/user details) is stored against the EDFK server-side, so that records from the winning endpoint can be subsequently enriched with the peer endpoint data extracted at step 1128. The record is not processed further, because only non-flow start records from the winning endpoint are enriched and passed written to the message queue 800 for cyber security analysis.

In the event a non-flow start record is received from the winning endpoint (meaning that the UID in the record matches the creator UID mapped to the EDFK—step 1128, 'yes' branch'), it is determined (step 1404) whether any peer endpoint has yet been recorded against the EDFK (this will not be the case if the endpoint server 620 is yet to receive and process any record containing endpoint data from the peer endpoint at step 1402). If not, and assuming the deduplication window is still open (step 1406, 'no' branch), the method proceeds to step 1128, where an entry is created in the delay line for the network telemetry record. Deduplication has not occurred at this point, but may do so shortly (the window is still open). The network telemetry record will, in due course, be retrieved from the delay line and subject to the same processing steps but at a later time (by which point the peer flow start record may have been received, or the deduplication window may have closed). Returning to step 1406, if the deduplication window has closed at that point, the method proceeds to step 1408 (in this case, deduplication hasn't occurred and won't because too much time has passed). The method also proceeds from step 1404 to step 1408 directly, if it is determined at step 1404 that the peer UID has been recorded against the EDFK (implying deduplication has already occurred and the method can proceed to the final steps immediately). Hence, at step 1408, it is either the case that the peer endpoint ID has been recorded (implying that the duplicate flow start record has been received from the peer endpoint and processed; the deduplication window may or may not have closed at this point, but in any event there is no need to wait until it has closed) or the peer UID has not been recorded but that the deduplication window has closed (implying the duplicate flow start record has not been received and processed but the system will not delay processing of the current record any longer). If peer endpoint data is available, the record received from the winning endpoint is enriched with the peer endpoint data at step 1130 (as described above); otherwise, the method proceeds straight to step 1132 (described above), and the enriched record from the winning endpoint is written to the message queue 800 at step 1134 for subsequent cybersecurity analysis.

Figure 12:
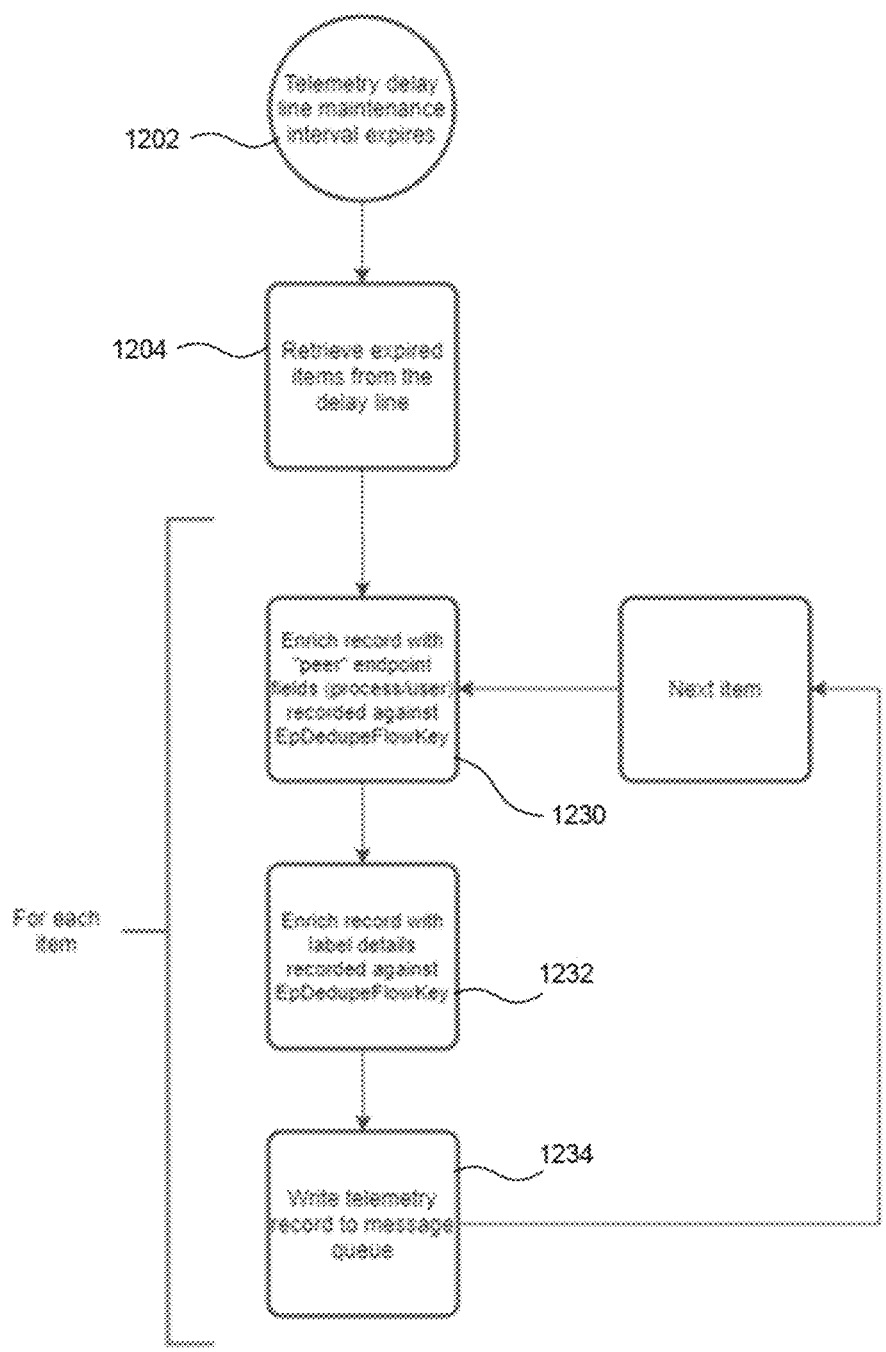
FIG. 12 shows a flowchart for a method of processing records in a delay line.

FIG. 12 shows a method of processing records held temporarily in the delay line.

Processing of a record in the delay line commences at step 1202, once a maintenance interval has expired. The maintenance interval is set so that it expires for the record when or shortly after the DEDUPE WINDOW has expired (the record is being held in the delay line because that interval had not expired when it was first processed at step 1126 of FIG. 11). At that point, the record is retrieved from the delay line (1134), and the method proceeds to steps 1230-1234, equivalent to steps 1130-1134 of FIG. 11 (the record is enriched with peer endpoint data and label information and added to the message queue 800), before proceeding to the next item in the delay line. FIG. 12 is a background process that runs in parallel to FIG. 11 and could, for example, be implemented by one or more additional threads.

Figure 15:
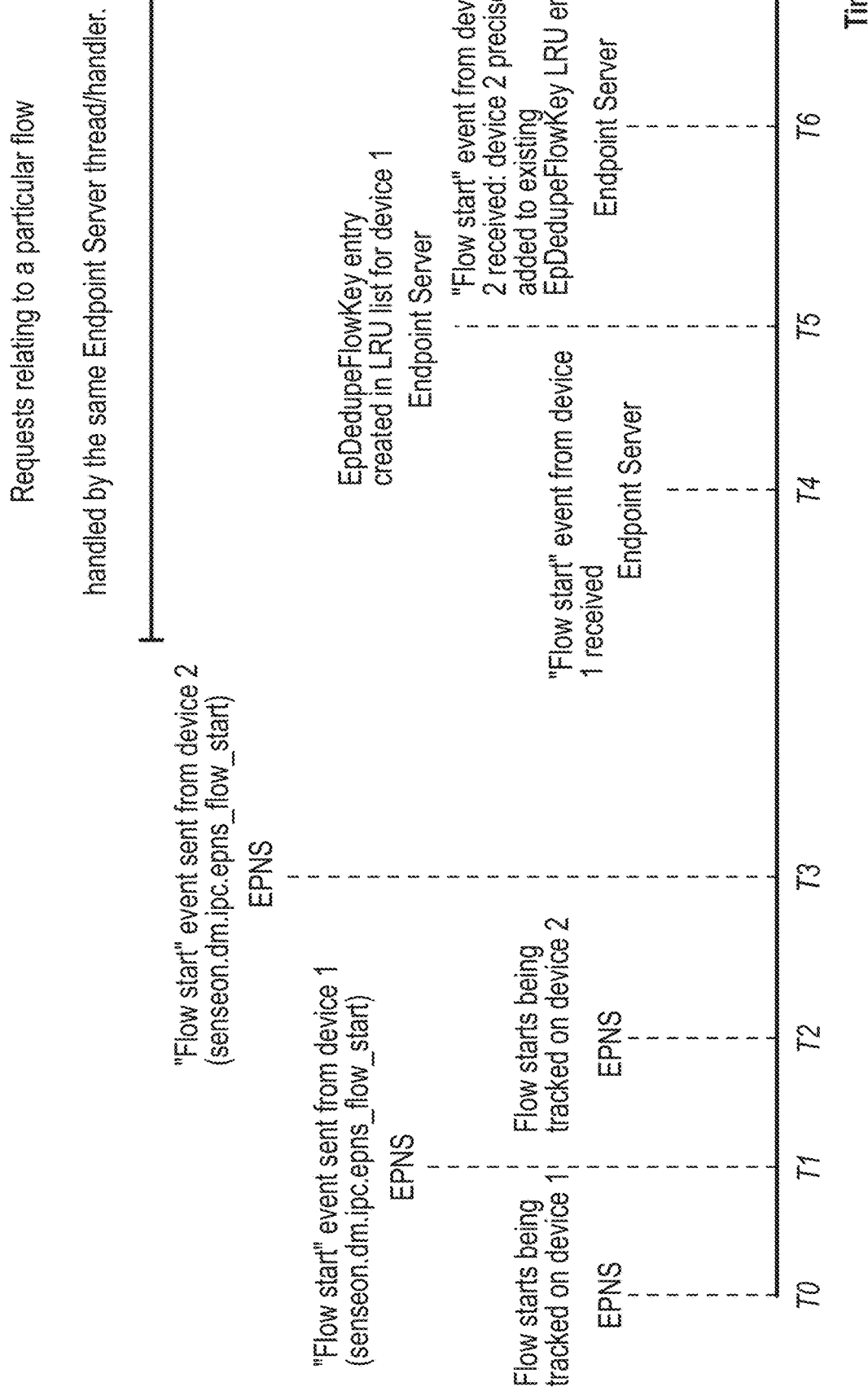
FIG. 15 shows an example deduplication timeline.
Figure 15:
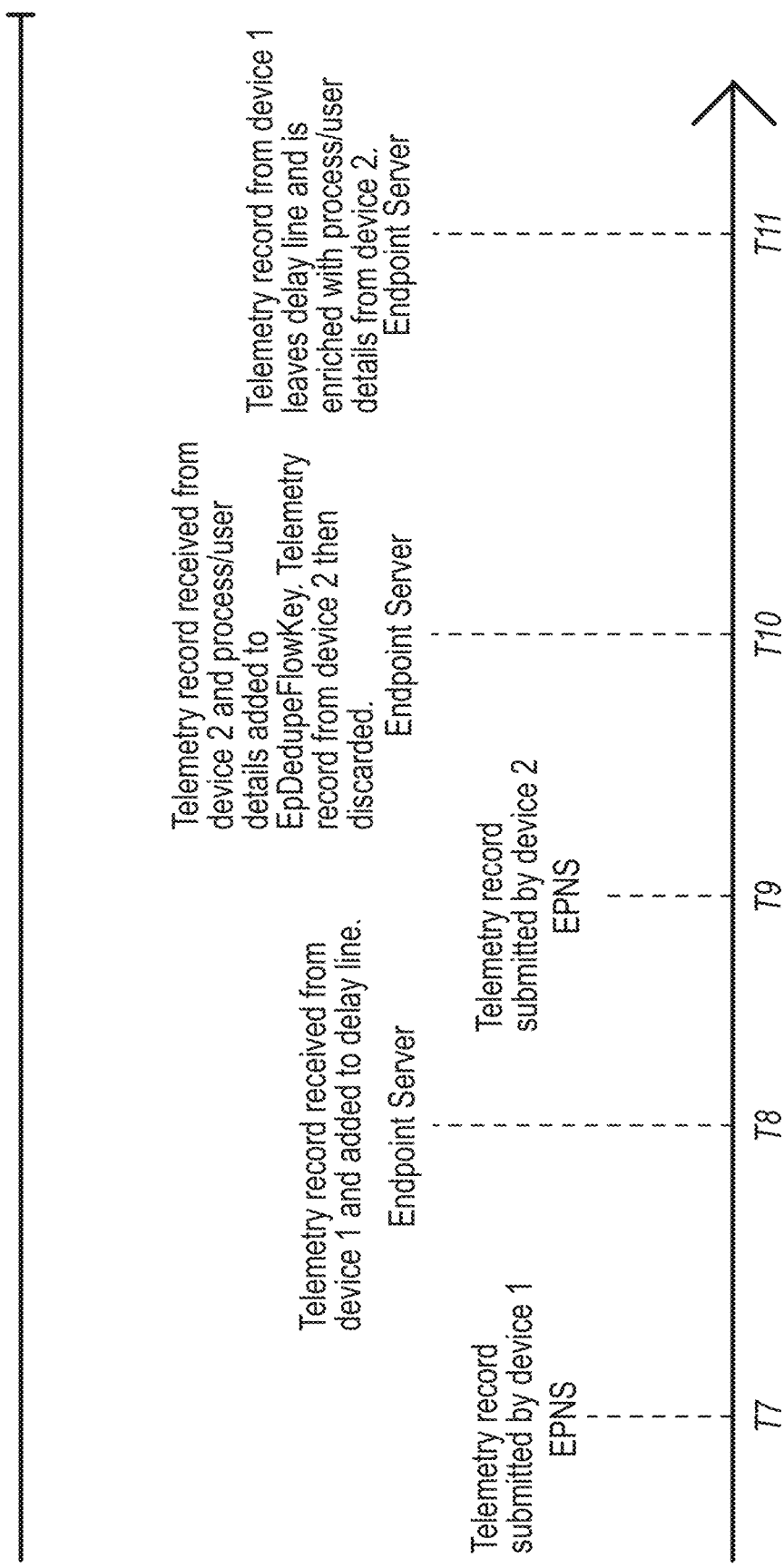

FIG. 15 shows an example timeline of typical deduplication interaction arising in the method of FIG. 14. In a multithreaded implementation of the EPNS 616, the EPNS 616 affinitizes flows to threads (all packets pertaining to a given flow are processed at the endpoint device 312 by the same processing thread, and that processing thread is also responsible for generating the flow start message for that flow). Flow start events can, therefore, be guaranteed to be sent by EPNS before any corresponding telemetry records for the same flow. The appliance network sensor 702 ensures this ordering is preserved in its submissions to the endpoint server 620, and the endpoint server 620 processes records related to a particular flow in the order received.

In FIG. 15, a flow starts being tracked on a first endpoint device (device 1) at time T0, which sends a flow start event at T1. The flow is between the first endpoint device and a second endpoint device (device 2), but may be established later at the second endpoint device than the first endpoint device, and/or detected later by the EPNS 616. The second device only starts tracking the flow at T2, and sends a flow start event at T3.

At the endpoint server 620, the flow start events are processed in the order they are received. The endpoint server 620 may comprise multiple threads and handlers, in which case all records pertaining to a particular flow are handled by the same server thread/handler. The flow start event from the first device is processed at T5, and an EDFK entry in the LRU list is created for device 1 at T5, containing the first device's UID and indicating the first device as the winning endpoint. At T6, the (duplicate) flow start event from the second device is received, and the second device's UID is added to the existing EDFK LRU entry for the flow in question (indicated as the peer endpoint). At T7, a subsequent telemetry record is submitted by device, and received at T8; at this point, no peer endpoint data has been received, therefore the telemetry record is added to the delay line.

At T9, a telemetry record is submitted by device 2, with device 2's endpoint data (e.g. process/user details), which is received at T10. The peer endpoint data is recorded against the EDFK of the flow in question, and the telemetry record from device 2 is then discarded.

At T11, the telemetry record from device 1 leaves the delay line, and is enriched with device 2's peer endpoint data and passed to the message queue 800.

Figure 16:
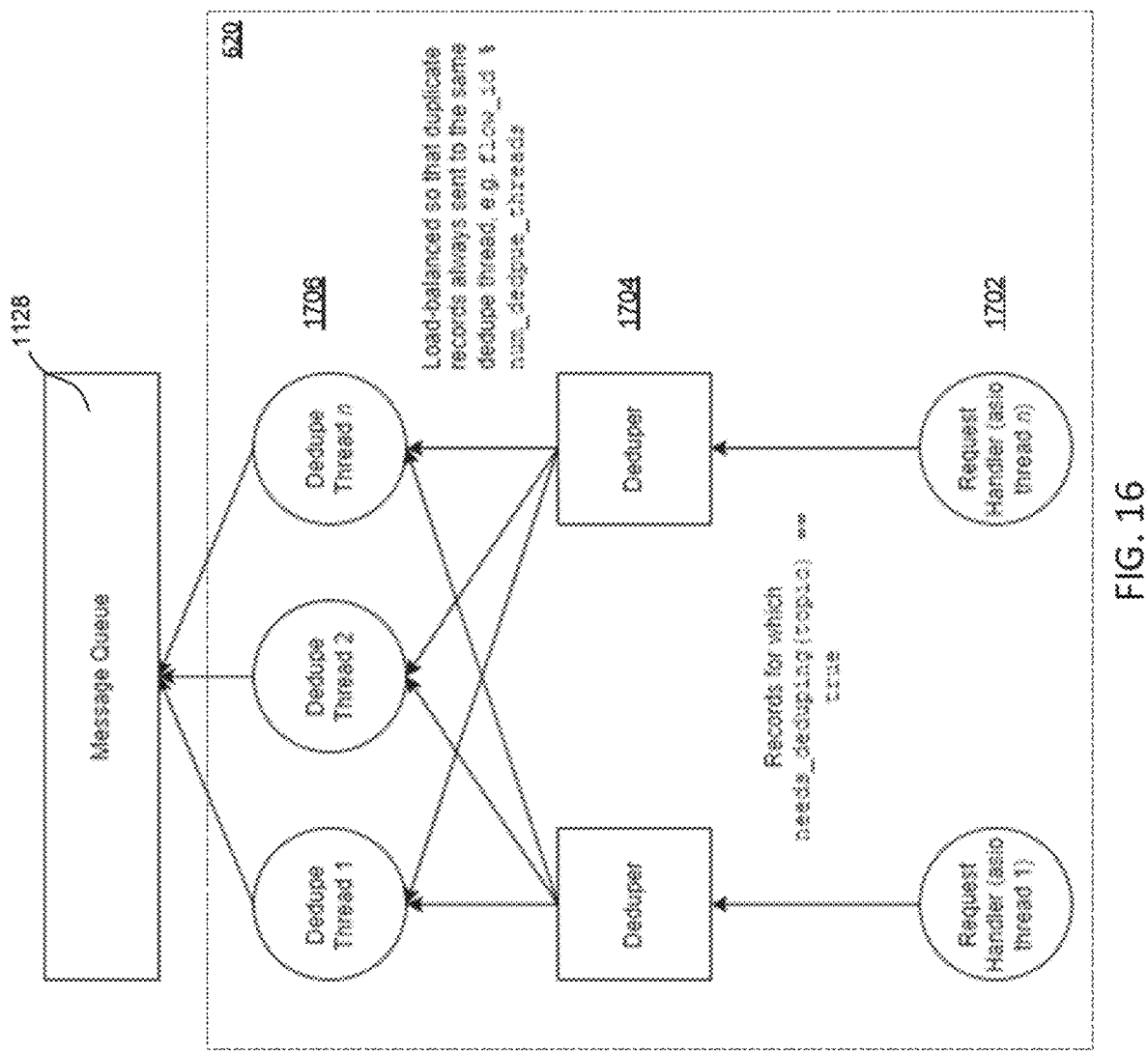
FIG. 16 shows a multithreaded architecture of an endpoint server.

FIG. 16 shows an example of a multithreaded architecture of the endpoint server 620. Records are received by one or more handlers 1602, and passed to one or more load balancers 1604 for distribution across multiple processing threads 1608 (dedup threads). Duplicate records are always sent to the same dedup thread.

It will be appreciated that the ordering of the steps depicted in FIGS. 10-12 and 15 may be varied to an extent whilst still achieving the same end result.

Figure 13:
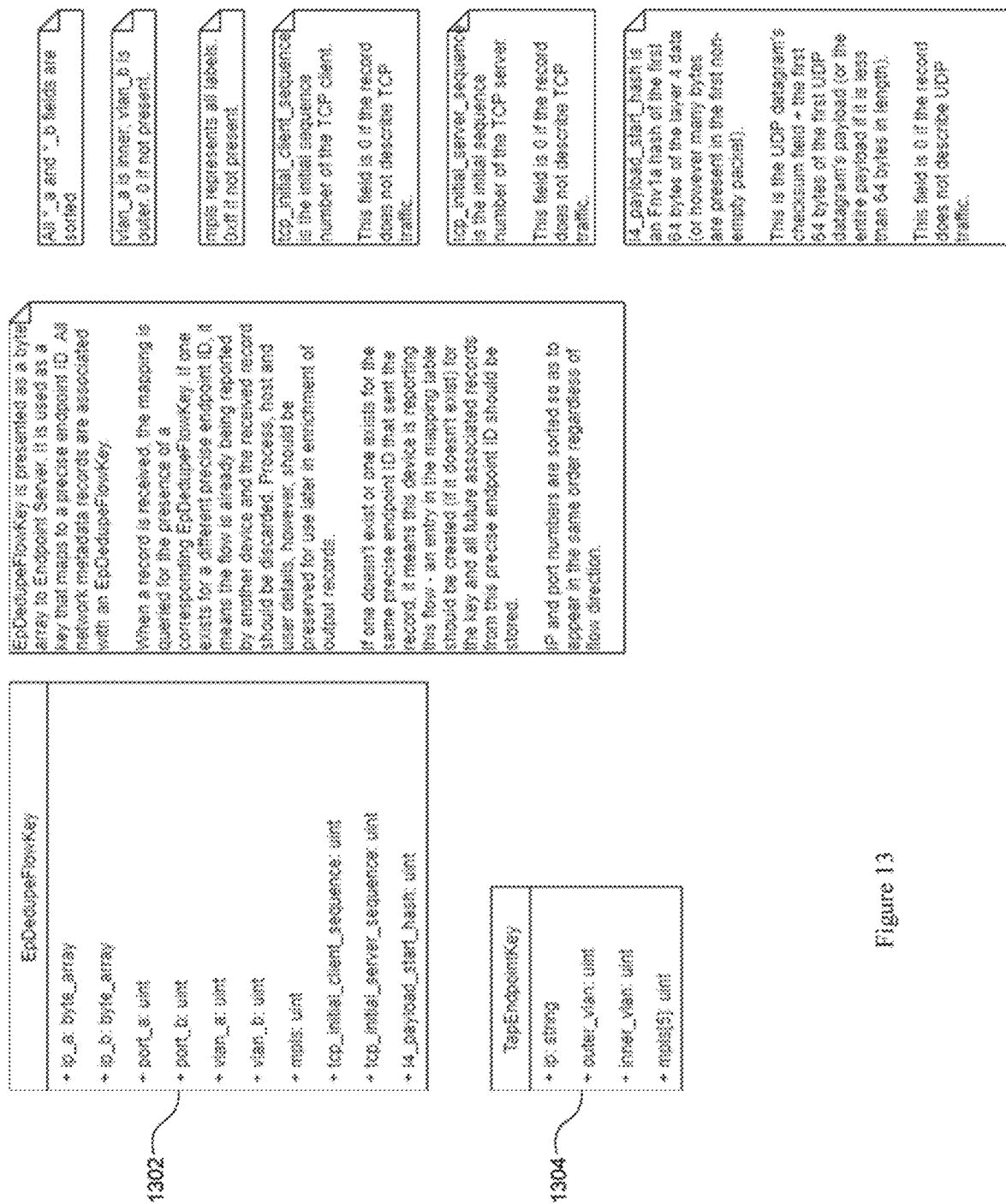
FIG. 13 schematically depicts a deduplication key and a TAP endpoint key.

FIG. 13 provides a schematic overview of the data contents of an endpoint deduplication flow key (EDFK 1302 would be used in the EP-EP deduplication process of FIG. 11, not to uniquely identify an individual endpoint, but to uniquely identify a particular network flow between two endpoints.

The concept of a network "flow" is not tied to any particular internet protocol and applies to non-connection-oriented protocols (such as UDP). A flow could correspond to a connection in a connection-oriented protocol (e.g. TCP), but could alternatively be non-connection-oriented traffic flow (e.g. in UDP).

The EDFK 1302 of FIG. 13 can accommodate both TCP and UDP flows, but it will be appreciated that the principles of uniquely identifying flows may be applied to other protocols.

By and large, a flow between two endpoints will be uniquely identified by their IP addresses and the ports associated with those IP addresses—that is certainly true when all endpoints being monitored are on the public Internet or, more generally, in the same address space. However, a situation can arise with endpoints in different address spaces; for example, two private networks with different address spaces, or a combination of endpoints in a private network(s) and the public Internet. In this case, one or more network address translators are used to map between the different address spaces. With this set up, two flows can "collide" where a first pair of endpoints operating in a first address space happen to have the same pair of IP addresses and ports as a second pair of endpoints operating in a second address space. This situation can largely be addressed by disregarding "stale" flows—recall that, at step 1106 of FIG. 11, an EDFK in the LRU list is only considered to indicate an existing flow if it was created within DEDUPE WINDOW seconds. Flows older than this are considered "stale" and are disregarded at step 1106. Therefore, for two flows to collide, not only do both pairs of endpoints have to have the same (IP address:port, IP address:port) pair, they must also commence their respective flows within a few seconds of each other. Such collisions are addressed by the additional elements of the EDFK 1302.

Where available, VLAN and/or MPLS tags can be used to resolve such clashes.

For TCP traffic, 32-bit TCP sequence numbers are included in packet headers to allow packets received out of order to be properly decoded. In accordance with the TCP, the initial sequence number (for the first packet sent by a given endpoint on a given TPC connection) is randomly chosen. In the already rare case that two pairs of endpoints with the same (IP address:port, IP address:port pair) commence a flow within a few seconds of each other, the probability of both endpoint pairs selecting the same pair of initial sequence numbers is vanishingly small. In this case, a flow is identified by the tuple (IP address:port+initial sequence number, IP address:port+initial sequence number).

UDP does not use sequence numbers. For UDP traffic (and other traffic more generally), the payload data can be used to help uniquely identify flows. In the example of FIG. 13, a hash of the first 14 bytes of payload data sent in the flow forms part of the EDFK 1302 used to uniquely identify a flow.

FIG. 13 additionally shows a TAP endpoint key 1304 used to indicate a source or destination endpoint in the EP-AP deduplication process of FIG. 9.

Unlike the EDFK 1302, the TAP endpoint key 1304 is specific to an individual endpoint, identified by IP address, together with any VLAN/MPLS labels attached to that IP address. Such labels can be attached to a TAP endpoint key 1304 in the same manner, at the network monitoring system 700, and reported to the endpoint server 620 in the same way.

The EDFK 1302 and TAP endpoint key 1304 are shown to have the following fields: EpDedupeFlowKey (FIG. 13, 1302):
+ip_a: byte_array
+ip_b: byte_array
+port_a: uint
+port_b: uint
+vlan_a: uint +vlan_b: uint
+mpls: uint
+tcp_initial_client_sequence: uint
+tcp_initial_server_sequence: uint
+14_payload_start_hash: uint The IP fields contain the IP addresses of the two endpoints. All *_a and *_b fields are sorted—this ensures that both endpoints generate the same EDFK for any given flow.
TapEndpointKey (FIG. 13, 1304):
+ip: string
+outer_vlan: uint
+inner_vlan: uint
+mpls[5]: uint vlan_a is inner; vlan_b is outer. 0 if not present.
mpls represents all labels. 0xff if not present.
tcp_initial_client_sequence is the initial sequence number of the TCP client. This field is 0 if the record does not describe TCP traffic.
tcp_initial_server_sequence is the initial sequence number of the TCP server. This field is 0 if the record does not describe TCP traffic.
14_payload_start_hash is an Fnv1a hash of the first 64 bytes of the layer 4 data (or however many bytes are present in the first non-empty packet). This is the UDP datagram's checksum field+the first 64 bytes of the first UDP datagram's payload (or the entire payload if it is less than 64 bytes in length). This field is 0 if the record does not describe UDP traffic.

A first example herein provides an endpoint agent configured, when executed on an endpoint device, to: access outgoing and/or incoming packets via a local traffic access function of the endpoint device, the outgoing packets sent from a network interface of the endpoint device to a packet-switched network and carrying outbound payload data generated by one or more processes executed on the endpoint device, the incoming packets received at the network interface from the packet-switched network and carrying inbound payload data for processing by the one or more processes; extract network traffic telemetry from the outgoing and/or incoming packets, the extracted network traffic telemetry summarizing the outgoing and/or incoming packets; and transmit, to a cybersecurity service, a series of network telemetry records containing the extracted network traffic telemetry for use in performing a cybersecurity threat analysis.

The endpoint agent may be configured to additionally monitor local activity by the processes at the endpoint device, and associate the series of network telemetry records with endpoint data about the local activity.

For example, the endpoint agent may be configured to match an incident of local activity by one of the processes with at least one packet of the incoming and/or outgoing packets, and thereby obtain one or more pieces of endpoint data related to the at least one packet, where at least one network telemetry record of the series of summary records is associated with the pieces of endpoint data, and the at least one network telemetry record pertains to the at least one packet with which the incident of local activity has been matched.

The one or more pieces of endpoint data may comprise details of the process and/or details of a parent process.

The endpoint agent may be configured to perform said matching based on: a local timing of the incident of local activity and a local timing of the at least one packet, and/or header information of the at least one packet and corresponding information obtained via said monitoring of local activity. For example, the matching may be performed based on local timing and/or connection tuple.

The incident of local activity may, for example, be one of the processes establishing a flow, the at least one network telemetry record identifying the flow and containing information about the process that established the flow.

As another example, the incident of local activity may be one of the processes accessing a file and the at least one network telemetry record contains information about the file.

The endpoint agent may be configured to determine a user account associated with at least one packet of the incoming and/or outgoing packets, and associate at least one network telemetry record of the series of network telemetry records with user information of the user account, the at least one network telemetry record pertaining to the at least one packet.

Further aspects and embodiments herein relate to "deduplication", in the context of such endpoint reporting—that is, addressing the situation in which two endpoint agents are summarizing (reporting) the same network traffic, and the situation in which an endpoint agent and a dedicated monitoring component (such as a TAP) are monitoring the same network traffic.

In embodiments of the first aspect, the endpoint agent may be configured, whilst generating the series of network telemetry records, to repeatedly transmit discovery messages to signal that the endpoint agent is currently monitoring local network traffic.

For example, each discovery message may be a DNS query with an encrypted message contained in a domain name field, the encrypted message indicating that the endpoint agent is currently monitoring local network traffic.

The extracting may comprise processing each packet to determine whether the packet constitutes the start of a network flow or pertains to an existing network flow and the network telemetry records may identify each network flow.

Each telemetry record may pertain to a new or existing flow, and at least one network telemetry record pertaining to a flow may contain metadata summarizing data carried by that flow.

The series of network telemetry records may be generated independently of any local threat detection performed at the endpoint device.

A second example herein provides a system for collecting network traffic data for cybersecurity analysis, the system comprising: at least two network ports connected to transparently pass network traffic between the network ports; and a monitoring component configured to selectively extract data of the network traffic passing between the network ports, and provide the selectively extracted data to a cybersecurity service for analysis; wherein the monitoring component is configured to detect a discovery message contained in at least one packet of the network traffic, the discovery message indicating that a source of the at least one network packet is also providing network traffic data to the cybersecurity service, and filter out one or more subsequent packets sent to or from the source of the at least one network packet, wherein the filtered-out network packets pass between the network ports transparently, but the monitoring component does not provide data of the filtered-out network packets to the cybersecurity service.

For example, the monitoring component and ports could be configured as a TAP, mirror or other dedicated network monitoring component.

The extracted data may be telemetry summarising the network traffic that is not filtered-out, the telemetry provided to the cybersecurity service in a series of network telemetry records.

The monitoring component may be configured to identify the source as a source IP address of the at least one network packet, and filter-out packets having a matching source or destination IP address.

The discovery message may be an encrypted message contained in a domain name field of a DNS query carried by the at least one packet, and the monitoring component may be configured to decrypt the message in order to determine that the source of the at least one network packet is also providing network traffic data to the cybersecurity service.

The network monitoring system may be configured to extract an endpoint identifier from the discovery message, determine at least one piece of network information about the source of the discovery message, and provide the piece of network information to the cybersecurity service in association with the endpoint identifier.

The at least one piece of network information may comprise at least one of: a VLAN tag, and an MPLS label.

A third aspect example provides a method of aggregating network telemetry records received from multiple endpoint agents executed on multiple endpoint devices, the method comprising: receiving from each of the endpoint agents a series of network telemetry records, the network telemetry records containing telemetry summarising local network traffic observed at the endpoint device on which the endpoint agent is executed, the network telemetry records having been associated by the endpoint agent with endpoint data captured by monitoring local activity by one or more processes executed at the endpoint device; detecting at least one duplicate network telemetry record received from a second of the endpoint devices, the duplicate network telemetry record duplicating network traffic information conveyed in a first network telemetry record received from a first of the endpoint devices in communication with the second endpoint device; extracting from the duplicate network telemetry record a second piece of endpoint data captured at the second endpoint; and associating the first network telemetry record received from the first endpoint device with the extracted piece of endpoint data as captured at the second endpoint device, the first network telemetry record having been additionally associated with a first piece of endpoint data at the first endpoint device.

The duplicate network telemetry record is detected by matching a second deduplication key thereof with a first deduplication key of the first network telemetry record, the deduplication keys identifying a common flow to which those telemetry records pertain.

The first and second deduplication keys may include or be based on TCP sequence numbers of those records. For example the keys could be based on those elements in the sense of being a hash or other function thereof.

The first and second deduplication keys may include or be based on a payload hash of those records (that is, a hash of some portion of the payload data).

The network telemetry records may comprise a flow start record received from the first endpoint, indicating the start of a flow, the at least one duplicate telemetry record comprising a duplicate flow start record indicating the start of the flow, the duplicate flow start record received subsequently from the second endpoint.

The method may comprise determining a deduplication key for the flow start record; determining that the deduplication key is not already associated with another endpoint identifier in a flow start cache, and associating the deduplication key with an identifier of the first endpoint in the flow start cache; when the duplicate flow start record has been subsequently received, determining a deduplication key for the duplicate flow start record, determining that the deduplication key is already associated with the identifier of the first endpoint in the flow start cache, and extracting the second piece of endpoint data from the duplicate flow start record.

The first network telemetry record may be enriched or otherwise associated with the extracted piece of endpoint data, and the duplicate network telemetry record may be discarded once that piece of endpoint data has been extracted.

The method may comprise receiving at least one piece of network information about the first and/or second endpoint from a network monitoring system, and enriching or otherwise associating the first network telemetry record with the at least one piece of network information.

The at least one piece of network information may comprise VPLS and/or VLAN label(s).

In embodiments of the first aspect, the local traffic access function may be provided by a network activity application programming interface (API) of an operating system (OS) of the endpoint device, the endpoint agent configured to access the incoming and outgoing packets via the network activity API.

Any of the aforementioned "associating" may be performed by augmenting or enriching at least one of the network telemetry records with endpoint data or by linking at least one of the network telemetry records with at least one other record containing the endpoint data.

A further example herein provides an endpoint device comprising: a network interface configured to send incoming packets carrying inbound payload data and/or receive outgoing packets carrying outbound payload data; one or more processing units configured to execute: one or more processes configured to process the inbound payload data and/or generate the outbound payload data, and the endpoint agent of the first aspect or any embodiment thereof, configured to extract the network traffic telemetry from the incoming and/or outgoing packets sent from and/or received at the network interface.

A further example herein provides executable program instructions configured so as, when executed on one or more computers, to implement any method, endpoint agent, or system functionality herein.

It will be appreciated that the examples described above are illustrative rather than exhaustive. In general, the functional components described above can be implemented in one or more computing devices at one or more locations within a localized or distributed computer system. A computer system comprises computing hardware which may be configured to execute any of the steps or functions taught herein. The term computing hardware encompasses any form/combination of hardware configured to execute steps or functions taught herein. Such computing hardware may comprise one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The invention claimed is:

1. An endpoint agent comprising computer-readable instructions embodied in non-transitory media and configured, when executed on an endpoint device, to:
access local network traffic via a local traffic access function of an operating system (OS) of the endpoint device, the local network traffic formed of: outgoing packets sent from a network interface of the endpoint device to a packet-switched network and carrying outbound payload data generated by one or more processes executed on the endpoint device and managed by the OS, and/or incoming packets received at the network interface from the packet-switched network and carrying inbound payload data for processing by the one or more processes;
obtain, via the OS, a piece of endpoint data associated with one or more network packets of the local network traffic; and
report the local network traffic to a cybersecurity service remote from the endpoint device for use in performing a cybersecurity threat analysis, by transmitting to the cybersecurity service a series of network traffic records containing network data of the local network traffic, wherein at least one network traffic record of the series of network traffic records pertains to the one or more network packets with which the piece of endpoint data is associated, and the endpoint agent is configured to augment or enrich the at least one network traffic record with the piece of endpoint data, or link at least one of the network traffic records with at least one other record containing the piece endpoint data and transmitted from the endpoint device to the cybersecurity service.

2. The endpoint agent of claim 1, wherein the piece of endpoint data comprises:
details of a process of the one or more processes that received and/or generated the one or more network packets.

3. The endpoint agent of claim 1, wherein the piece of endpoint data comprises details of a parent process of the one or more processes, the parent process being a parent of another process of the one or more processes that received and/or generated the one or more network packets.

4. The endpoint agent of claim 1, wherein the piece of endpoint data is associated with the one or more network packets by the OS, and the endpoint agent is configured to locate the piece of endpoint data via the OS.

5. The endpoint agent of claim 1, configured to associate the one or more network packets with the piece of endpoint data, by monitoring via the OS local activity by the processes at the endpoint device.

6. The endpoint agent of claim 5, configured to match an incident of local activity by a process of the one or more processes with the one or more network packets, and thereby associate the piece of endpoint data with the one or more network packets.

7. The endpoint agent of claim 6, configured to match the incident of local activity with the one or more network packets based on:
a local timing of the incident of local activity and a local timing of the at least one packet, and/or
header information of the at least one packet and corresponding information obtained via said monitoring of local activity.

8. The endpoint agent of claim 6, wherein the incident of local activity is the process establishing a flow, the at least one network traffic record identifying the flow and containing information about the process that established the flow.

9. The endpoint agent of claim 1, wherein the piece of endpoint data comprises user information of a user account associated with the one or more network packets.

10. The endpoint agent of claim 1, wherein the piece of endpoint data comprises information about a file associated with the one or more network packets.

11. The endpoint agent of claim 1, wherein the network data contained in the series of network traffic records comprises payload metadata that does not duplicate all payload data carried in of the one or more network packets but summarizes the payload data carried in the one or more network packets.

12. The endpoint of agent of claim 1, comprising local threat detection instructions configured to:
process the local network traffic and the endpoint data;
detect a cybersecurity security threat local to the endpoint device.

13. The endpoint agent of claim 1, comprising local threat remediation instructions configured to implement a remediation action at the endpoint device in response to a remediation command.

14. The endpoint agent of claim 1, wherein the network data has the form of network metadata summarizing the local network traffic.

15. The endpoint agent of claim 14, wherein the network data is structured metadata generated based on one or more network data schemas applied to the local network traffic.

16. The endpoint agent of claim 14, configured to generate network metadata summarizing the one or more network packets based on one or more network protocols associated with the one or more network packets.

17. The endpoint agent of claim 1, wherein the piece of endpoint data forms part of a structured set of endpoint metadata generated based on one or more endpoint data schemas applied to raw endpoint data obtained via the OS.

18. An endpoint device comprising:
a memory embodying an endpoint agent in the form of computer-readable instructions;
one or more processing units configured to execute the endpoint; and
a network interface configured to send receive network traffic comprising incoming packets carrying inbound payload and outgoing packets carrying outbound payload data;
wherein the one or more processing units are configured to execute: an operating system (OS), and one or more processes managed by the OS and configured to process the inbound payload data and generate the outbound payload data;
wherein the endpoint agent is configured to cause the one or more processing units to:
obtain, via the OS, a piece of endpoint data associated with one or more network packets of the local network traffic; and
report the local network traffic to a cybersecurity service remote from the endpoint device for use in performing a cybersecurity threat analysis, by transmitting to the cybersecurity service a series of network traffic records containing network data of the local network traffic, wherein at least one network traffic record of the series of network traffic records pertains to the one or more network packets with which the piece of endpoint data is associated, and the endpoint agent is configured to augment or enrich the at least one network traffic record with the piece of endpoint data, or link at least one of the network traffic records with at least one other record containing the piece endpoint data and transmitted from the endpoint device to the cybersecurity service.

19. The endpoint device of claim 18, wherein the piece of endpoint data comprises:
   details of a process of the one or more processes that received and/or generated the one or more network packets.

20. The endpoint device of claim 18, wherein the piece of endpoint data comprises details of a parent process of the one or more processes, the parent process being a parent of another process of the one or more processes that received and/or generated the one or more network packets.

21. The endpoint device of claim 18, wherein the piece of endpoint data is associated with the one or more network packets by the OS, and the endpoint agent is configured to locate the piece of endpoint data via the OS.

22. The endpoint device of claim 18, configured to associate the one or more network packets with the piece of endpoint data, by monitoring local activity by the processes at the endpoint device.

\* \* \* \* \*